(12) United States Patent
Nagasaka

(10) Patent No.: US 11,038,980 B2
(45) Date of Patent: Jun. 15, 2021

(54) INFORMATION PROCESSING APPARATUS, INFORMATION PROCESSING METHOD, AND PROGRAM

(71) Applicant: Sony Corporation, Tokyo (JP)

(72) Inventor: Hideo Nagasaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/755,157

(22) PCT Filed: Aug. 2, 2018

(86) PCT No.: PCT/JP2018/029004
§ 371 (c)(1),
(2) Date: Apr. 10, 2020

(87) PCT Pub. No.: WO2019/077846
PCT Pub. Date: Apr. 25, 2019

(65) Prior Publication Data
US 2020/0304593 A1   Sep. 24, 2020

(30) Foreign Application Priority Data
Oct. 17, 2017   (JP) .............................. JP2017-200754

(51) Int. Cl.
*G06F 15/16* (2006.01)
*H04L 29/08* (2006.01)

(52) U.S. Cl.
CPC ............ *H04L 67/306* (2013.01); *H04L 67/26* (2013.01)

(58) Field of Classification Search
CPC .............................. H04L 67/306; H04L 67/26

USPC ......................................................... 709/206
See application file for complete search history.

(56) References Cited

U.S. PATENT DOCUMENTS

| | | | |
|---|---|---|---|
| 9,361,373 B1 | 6/2016 | Price | |
| 9,384,502 B2 | 7/2016 | Guo et al. | |
| 2005/0185918 A1* | 8/2005 | Lowe ................... | H04N 21/262 386/228 |

(Continued)

FOREIGN PATENT DOCUMENTS

| JP | 2003-108174 A | 4/2003 |
|---|---|---|
| JP | 2005242399 A | 9/2005 |

(Continued)

OTHER PUBLICATIONS

International Search Report and Written Opinion dated Sep. 11, 2018 for PCT/JP2018/029004 filed on Aug. 2, 2018, 9 pages including English Translation of the International Search Report.

(Continued)

*Primary Examiner* — Atta Khan
(74) *Attorney, Agent, or Firm* — Xsensus LLP

(57) ABSTRACT

To enable provision of content to a user in a more preferred mode without cumbersome operation.
There is provided an information processing apparatus including an extracting unit configured to extract at least part of messages from one or more messages which a user is notified of, on the basis of a predetermined condition, and a generating unit configured to generate second content which includes one or more pieces of first content depending on the extracted at least part of messages, and in which information is presented in chronological order.

13 Claims, 19 Drawing Sheets

(56) References Cited

U.S. PATENT DOCUMENTS

| | | | |
|---|---|---|---|
| 2006/0165379 A1 | 7/2006 | Agnihotri et al. | |
| 2007/0260460 A1 | 11/2007 | Hyatt | |
| 2009/0235280 A1* | 9/2009 | Tannier | G06Q 10/00 |
| | | | 719/318 |
| 2011/0087971 A1* | 4/2011 | Kamrani | G06Q 10/06 |
| | | | 715/752 |
| 2011/0264685 A1 | 10/2011 | Cheng | |
| 2014/0243028 A1* | 8/2014 | Colombo | H04L 51/08 |
| | | | 455/466 |
| 2015/0256499 A1 | 9/2015 | Kumar et al. | |
| 2017/0099592 A1* | 4/2017 | Loeb | H04L 67/303 |
| 2017/0161372 A1* | 6/2017 | Fern Ndez | G06F 40/268 |

FOREIGN PATENT DOCUMENTS

| | | |
|---|---|---|
| JP | 2007-519053 A | 7/2007 |
| JP | 2009-536500 A | 10/2009 |
| JP | 2010283488 A | 12/2010 |
| JP | 2011180646 A | 9/2011 |
| JP | 2011254342 A | 12/2011 |
| JP | 2016208289 A | 12/2016 |
| WO | 2013/047163 A1 | 4/2013 |

OTHER PUBLICATIONS

Extended European search report dated May 14, 2020, issued in corresponding European Patent Application No. 18867646.4.

* cited by examiner

FIG. 5

| OPENED STATE | TRANSMITTER | MESSAGE HAVING PREDETERMINED INTENTION | EXAMPLES OF INTENTION |
|---|---|---|---|
| ALL UNREAD MESSAGES | SPECIFIC TRANSMITTERS (FOR EXAMPLE OFFICIAL) | YES | COME TO LIVE, WATCH TV PROGRAM, WATCH MOVING IMAGE, BUY PRODUCT, LISTEN TO MUSIC, WATCH MOVIE |
| | | NO | |
| | UNSPECIFIED (GENERAL USERS) | YES | COME TO LIVE, WATCH TV PROGRAM, WATCH MOVING IMAGE, BUY PRODUCT, LISTEN TO MUSIC, WATCH MOVIE |
| | | NO | |

INFORMATION PROCESSING APPARATUS, INFORMATION PROCESSING METHOD, AND PROGRAM

CROSS-REFERENCE TO RELATED APPLICATIONS

The present application is based on PCT filing PCT/JP2018/029004, filed Aug. 2, 2018, which claims priority to JP 2017-200754, filed Oct. 17, 2017, the entire contents of each are incorporated herein by reference.

TECHNICAL FIELD

The present disclosure relates to an information processing apparatus, an information processing method, and a program.

BACKGROUND ART

As a medium for providing various kinds of content such as an image (a still image and a moving image) and a music to a user, program broadcasting such as TV broadcasting and radio broadcasting is typically known. Further, in recent years, in accordance with development of a network technology, it has become possible to provide content via service utilizing a network such as the Internet. In this manner, in recent years, means for allowing a user to view or listen to content has become diversified. For example, Patent Document 1 discloses an example of a technology for providing audio and video content to a user via a network.

Further, it has become possible to directly advertise content to an individual user by utilizing a message such as an email, or it has become possible to guide the user to viewing or listening to the content by attaching a link, or the like.

CITATION LIST

Patent Document

Patent Document 1: Japanese Patent Application Laid-Open No. 2009-536500

SUMMARY OF THE INVENTION

Problems to be Solved by the Invention

Meanwhile, there is a case where a user is required to perform cumbersome operation for viewing or listening to content.

For example, in recent years, in accordance with diversification of a method for notifying a user of information, while an amount of information which the user is notified of tends to increase, not all the information is necessarily information regarding content which suits preference of the user. Under such circumstances, for example, there is a case where, in order to view or listen to content which suits the preference of the user, the user is required to perform cumbersome operation (that is, active operation) such as extraction of information (for example, search of information) from a large amount of information which the user is notified of and confirmation of content of the notified message.

Therefore, the present disclosure proposes a technology for enabling provision of content to a user in a more preferred mode without cumbersome operation.

Solutions to Problems

According to the present disclosure, there is provided an information processing apparatus including an extracting unit configured to extract at least part of messages from one or more messages which a user is notified of on the basis of a predetermined condition, and a generating unit configured to generate second content which includes one or more pieces of first content depending on the extracted at least part of messages, and in which information is presented in chronological order.

Furthermore, according to the present disclosure, there is provided an information processing apparatus including an acquiring unit configured to acquire second content which is extracted from one or more messages which a user is notified of, which includes one or more pieces of first content depending on at least part of messages on the basis of a predetermined condition, and in which information is presented in chronological order, and a control unit configured to perform control so that the second content is presented via an output unit.

Furthermore, according to the present disclosure, there is provided an information processing method including by a computer, extracting at least part of messages from one or more messages which a user is notified of, on the basis of a predetermined condition, and generating second content which includes one or more pieces of first content depending on the extracted at least part of messages, and in which information is presented in chronological order.

Furthermore, according to the present disclosure, there is provided an information processing method including, by a computer, acquiring second content which is extracted from one or more messages which a user is notified of, which includes one or more pieces of first content depending on at least part of messages on the basis of a predetermined condition, and in which information is presented in chronological order, and controlling so that the second content is presented via an output unit.

Furthermore, according to the present disclosure, there is provided a program for causing a computer to execute extracting at least part of messages from one or more messages which a user is notified of, on the basis of a predetermined condition, and generating second content which includes one or more pieces of first content depending on the extracted at least part of messages, and in which information is presented in chronological order.

Furthermore, according to the present disclosure, there is provided a program for causing a computer to execute, acquiring second content which is extracted from one or more messages which a user is notified of, which includes one or more pieces of first content depending on at least part of messages on the basis of a predetermined condition, and in which information is presented in chronological order, and controlling so that the second content is presented via an output unit.

Effects of the Invention

According to the present disclosure as described above, a technology for enabling provision of content to a user in a more preferred mode without cumbersome operation is provided.

Note that the effects described above are not necessarily limitative. With or in place of the above effects, there may

BRIEF DESCRIPTION OF DRAWINGS

FIG. 5 is an explanatory diagram for explaining an example of processing relating to extraction of a message to be utilized for generation of a program by the information processing system according to the embodiment.

MODE FOR CARRYING OUT THE INVENTION

Figure 1:
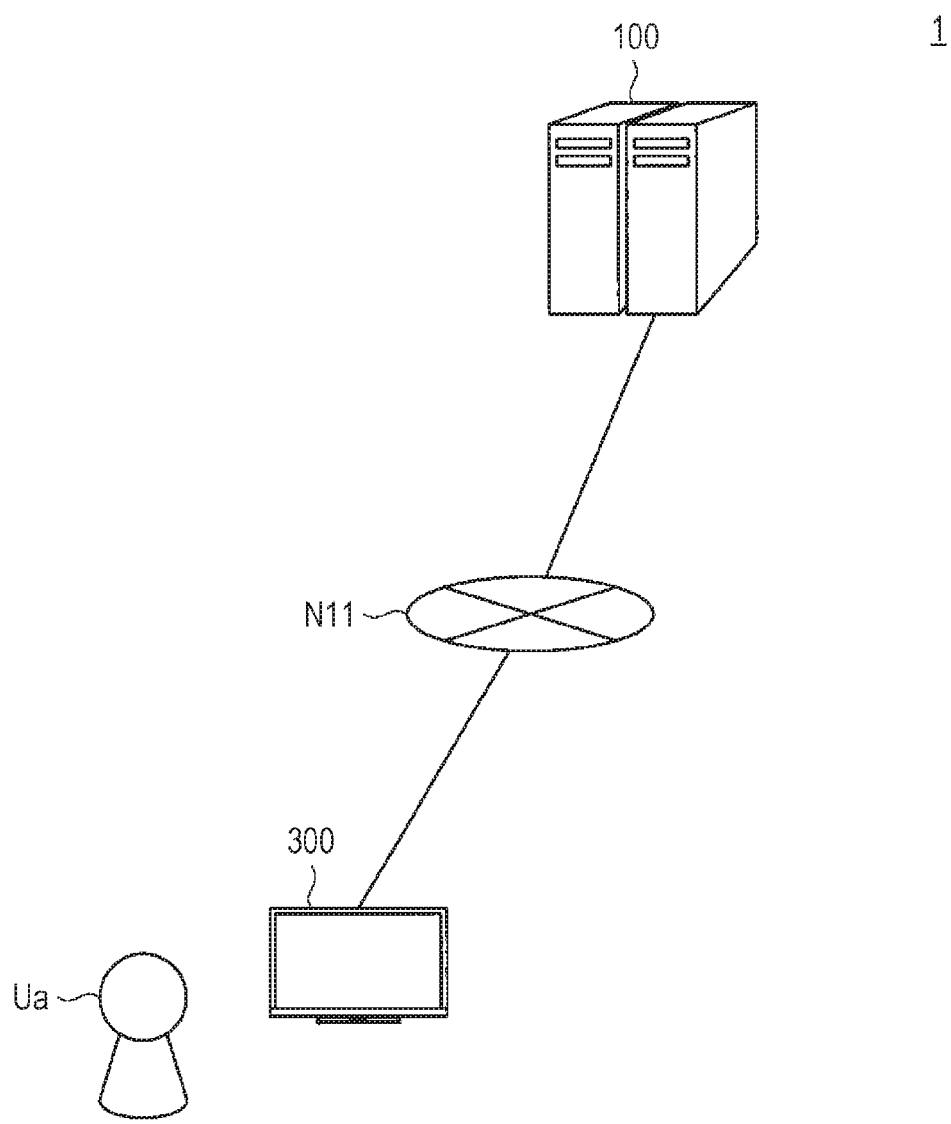
FIG. 1 is a view illustrating an example of a system configuration of an information processing system according to an embodiment of the present disclosure.

Hereinafter, a preferred embodiment of the present disclosure will be described in detail with reference to the appended drawings. Note that, in this specification and the appended drawings, structural elements that have substantially the same functional configuration are denoted with the same reference numerals, and repeated explanation of these structural elements is omitted.

Note that description will be provided in the following order.

1. Introduction
2. Configuration
  2.1. System configuration
  2.2. Functional configuration
3. Processing
  3.1. Outline of processing relating to generation of program
  3.2. Flow of a series of processing
4. Modified examples
  4.1. Modified Example 1: example of presentation mode of program
  4.2. Modified Example 2: example of method for realizing interaction
  4.3. Modified Example 3: example of control for personalization
  4.4. Modified Example 4: control of instruction which can be accepted from user
5. Examples
  5.1. Example 1: example of configuration of program relating to advertisement of broadcast program
  5.2. Example 2: application example of MC unit
  5.3. Example 3: presentation example of a plurality of pieces of content
  5.4. Example 4: example of flow of processing relating to generation and presentation of program
6. Hardware configuration
7. Conclusion

1. INTRODUCTION

As mentioned above, as a medium for providing various kinds of content such as an image (a still image and a moving image) and a music to a user, program broadcasting such as TV broadcasting and radio broadcasting is typically known. Such program broadcasting is, for example, unilaterally transmitted from a broadcast station and transmitted to many and unspecified users at the same time, and a user can passively view or listen to the broadcasted program via an apparatus such as a TV set. Meanwhile, because program broadcasting has characteristics of being transmitted many and unspecified users, the broadcasted program does not necessarily suit preference of the user.

In contrast, in recent years, in accordance with development of a network technology, for example, it has become also possible to provide content through Web service via a network such as the Internet, like video distribution service, or the like. In this manner, in recent years, means for allowing a user to view or listen to content has become diversified.

Further, means for allowing a user to acquire information regarding content has also become diversified. For example, it is also possible to directly advertise content to an individual user by utilizing a message such as an email. Further, it is also possible to guide a user to viewing or listening to content by a link, or the like, for accessing the content being described or attached to the message. Particularly, in recent years, a method for notifying the user of information has become diversified, and, as well as an email, distribution of a message, or the like, using message service has been also utilized to advertise content or guide the user.

Meanwhile, there is a case where a user is required to perform cumbersome operation for viewing or listening to content.

For example, in recent years, in accordance with diversification of a method for notifying the user of information, an amount of information which the user is notified of tends to increase. However, all the information which the user is notified of is not necessarily information regarding content. Further, even if the notified information is information regarding content, the content does not necessarily suit preference of the user. Under such circumstances, for example, there is a case where, in order to view or listen to content which suits the preference of the user, the user is required to perform cumbersome operation (in other words, active operation) such as extraction of information through, for example, search among a large amount of information which the user is notified of, and confirmation of content of the notified message.

In contrast, for program broadcasting such as TV broadcasting and radio broadcasting, the user can passively view or listen to content without performing cumbersome operation. However, as mentioned above, because the program broadcasting has characteristics of being transmitted to many and unspecified users, there is a case where it is difficult to provide content which suits the preference of the user better.

In view of such circumstances, for example, it is desired to establish a technology which enables a user to passively acquire information which suits the preference of the user better without cumbersome operation.

Therefore, the present disclosure proposes an example of the technology which enables provision of content to a user in a more preferred mode without cumbersome operation. Specifically, the present disclosure proposes an example of the technology which enables the user to passively view or listen to content which suits the preference of the user better (that is, passively acquire information which suits the preference of the user better) without performing active operation.

2. CONFIGURATION

An example of a configuration of an information processing system according to the present embodiment will be described below.

2.1. System Configuration

First, an example of a schematic system configuration of an information processing system according to an embodiment of the present disclosure will be described with reference to FIG. 1. FIG. 1 is a view illustrating an example of the system configuration of the information processing system according to an embodiment of the present disclosure.

As illustrated in FIG. 1, the information processing system 1 according to the present embodiment includes an information processing apparatus 100 and a terminal apparatus 300. Further, the information processing system 1 may include a storage unit 190. The information processing apparatus 100 and the terminal apparatus 300 are connected so as to be able to transmit and receive information to and from each other via a network N11. Note that a type of the network N11 is not particularly limited. As a specific example, the network N11 may be configured with a so-called wireless network like a network based on various kinds of standards such as 3G, 4G, Wi-Fi (registered trademark) and Bluetooth (registered trademark). Further, the network N11 may be configured with the Internet, a leased line, a local area network (LAN), a wide area network (WAN), or the like. Further, the network N11 may include a plurality of networks, or may be configured such that at least part of the network is a wired network.

The terminal apparatus 300 includes output interface for presenting various kinds of information to the user. For example, the terminal apparatus 300 may include a display unit such as a display and may present desired information to the user by causing display information such as an image (for example, a still image and a moving image) to be displayed at the display unit. With such a configuration, for example, the terminal apparatus 300 can acquire content from the information processing apparatus 100 and present display information based on the acquired content to the user via the display unit. Further, as another example, the terminal apparatus 300 may present desired information to the user by projecting display information (for example, display information based on the above-described content) on a desired projection plane, like a so-called projection type display apparatus (projector).

Further, the terminal apparatus 300 may include an audio output unit such as a speaker, and may present desired information to the user by outputting speech and audio via the audio output unit. With such a configuration, for example, the terminal apparatus 300 can present speech and audio in accordance with content acquired from the information processing apparatus 100 to the user via the audio output unit. Further, in this event, in a case where content such as a document including character information to be presented to the user is acquired, the terminal apparatus 300 may synthesize speech in accordance with the character information on the basis of a technology such as, for example, Text to Speech and may output the speech.

Further, the terminal apparatus 300 may include input interface for accepting input of information from the user. For example, the terminal apparatus 300 may include a sound collecting unit such as a microphone, and may be configured to be able to collect audio in an ambient environment. With such a configuration, for example, the terminal apparatus 300 can also transmit speech data (in other words, audio data) in accordance with a sound collection result of speech uttered by the user to the information processing apparatus 100 as input information from the user. Further, the terminal apparatus 300 may recognize intention indicated by speech by performing analysis processing such as speech recognition and natural language processing on the sound collection result of the speech uttered by the user and may transmit a result of the recognition to the information processing apparatus 100 as input information from the user.

Further, a type of information to be acquired as input information from the user is not limited only to the above-described speech. As a specific example, the terminal apparatus 300 may include an input device such as a touch panel, a mouse and a keyboard, and may accept input of information from the user via the input device. In this case, the terminal apparatus 300 may transmit information based on input from the user via the input device to the information processing apparatus 100 as the input information.

Further, as another example, the terminal apparatus 300 may recognize operation utilizing an operating body such as a finger and a hand by utilizing a result of image capturing by an imaging unit, a result of a distance measured by a distance measurement sensor, or the like, and may acquire information based on the recognition result as the input information. As a specific example, the terminal apparatus 300 can emit probing light toward a predetermined region to be probed and can recognize an operating body (eventually, operation by the operating body) in accordance with a detection result of reflected light reflected by the operating body such as the hand. With such a configuration, for example, the terminal apparatus 300 can detect touch operation on an image projected on a projection plane by a projecting unit and can acquire information based on the detection result of the touch operation as the input information. Further, by utilizing such a configuration, for example, the terminal apparatus 300 can detect touch operation on an image projected on the projection plane by the projecting unit and can acquire information based on the detection result of the touch operation as the input information. Further, as another example, the terminal apparatus 300 can also detect display information projected on a projection plane and operation by the operating body such as the hand and the finger on the display information by capturing an image of a region including the projection plane by the imaging unit and analyzing the image. Further, in this event, the terminal apparatus 300 may recognize content of operation from the user on the display information projected on the projection plane by recognizing operation (for example, gesture) of the operating body such as the hand and the finger.

The information processing apparatus 100 transmits various kinds of content to the terminal apparatus 300 via the network N11. Particularly, the information processing apparatus 100 according to the present embodiment extracts content associated with various kinds of information (hereinafter, also referred to as a "message D110") which the user is notified of, generates a series of content including the extracted one or more pieces of content, and transmits the series of content to the terminal apparatus 300 associated with the user. Further, the information processing apparatus 100 may preferentially utilize the notified message D110 personalized for each user to extract content. Note that the present operation will be described in detail later.

Further, the information processing apparatus 100 may execute processing appropriate for content, in accordance with input information from the user acquired during presentation of the content (for example, during reproduction of the content). Note that the present operation will be also described in detail later.

Note that the above-described system configuration of the information processing system 1 according to the present embodiment is merely an example, and if respective functions of the terminal apparatus 300 and the information processing apparatus 100 described above are realized, the system configuration of the information processing system 1 is not necessarily limited to the example illustrated in FIG. 1. As a specific example, the terminal apparatus 300 and the information processing apparatus 100 may be integrally configured. In this case, for example, the information processing apparatus 100 may include an output unit such as a display and a speaker, and may present content to the user via the output unit.

Further, as another example, part of functions among the respective functions of the information processing apparatus 100 may be provided at other apparatuses. In a similar manner, part of functions among the respective functions of the terminal apparatus 300 may be provided at other apparatuses.

Further, the respective functions of the information processing apparatus 100 may be realized by a plurality of apparatuses operating in coordination with each other. As a more specific example, the respective functions of the information processing apparatus 100 may be provided by virtual service (for example, cloud service) which is realized by coordination of a plurality of apparatuses. In this case, the service corresponds to the above-described information processing apparatus 100. In a similar manner, the respective functions of the terminal apparatus 300 may be realized by a plurality of apparatuses operating in coordination with each other.

An example of the schematic system configuration of the information processing system according to an embodiment of the present disclosure has been described above with reference to FIG. 1.

2.2. Functional Configuration

Subsequently, an example of functional configurations of respective apparatuses constituting the information processing system according to the present embodiment will be described.

(Configuration Example of Terminal Apparatus 300)

Figure 2:
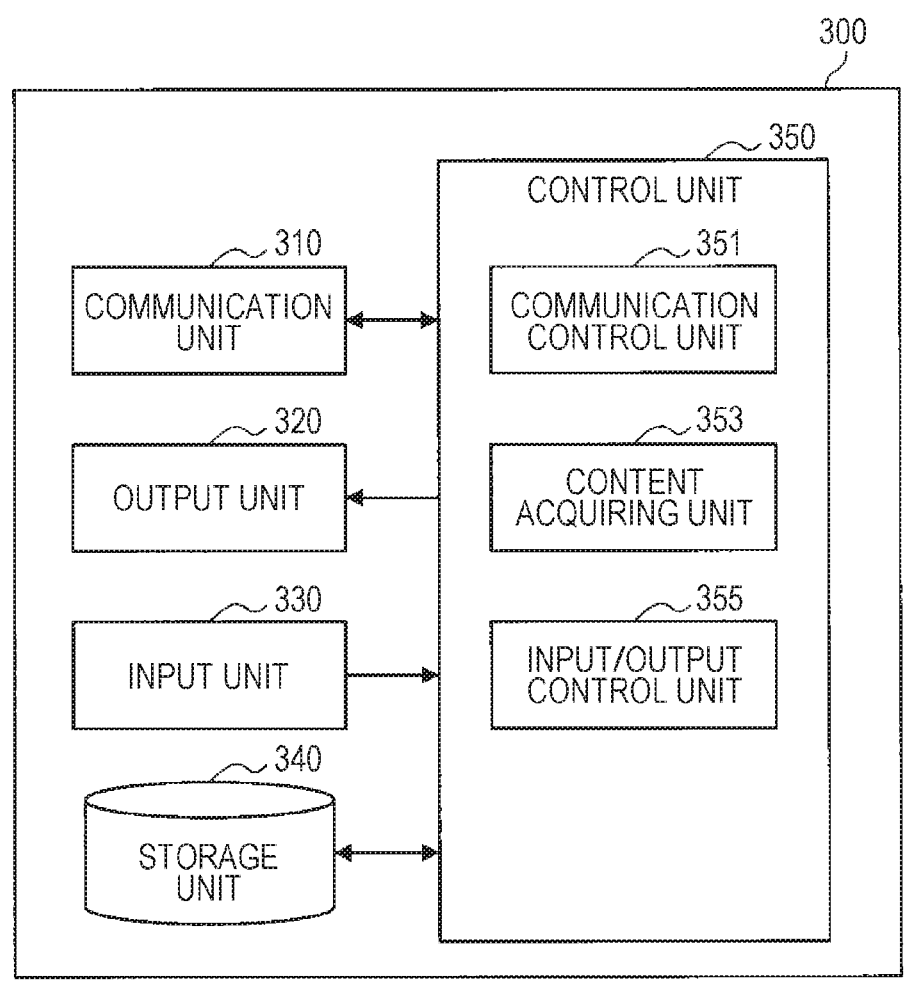
FIG. 2 is a block diagram illustrating an example of a functional configuration of a terminal apparatus according to the embodiment.

First, an example of the functional configuration of the terminal apparatus 300 according to the present embodiment will be described with reference to FIG. 2. FIG. 2 is a block diagram illustrating an example of the functional configuration of the terminal apparatus 300 according to the present embodiment.

As illustrated in FIG. 2, the terminal apparatus 300 includes a communication unit 310, an output unit 320, an input unit 330, a storage unit 340 and a control unit 350.

The communication unit 310 is a component for allowing each component of the terminal apparatus 300 to perform communication with other apparatuses via a predetermined network. Note that a type of the network accessed by the terminal apparatus 300 is not particularly limited. Therefore, a configuration of the communication unit 310 may be changed as appropriate according to the type of the network.

For example, the communication unit 310 may include components for performing communication with a base station via a wireless network based on standards such as 3G and 4G. With such a configuration, the terminal apparatus 300 can transmit and receive information to and from the information processing apparatus 100 via the base station by accessing the base station.

Further, the communication unit 310 may include components for performing communication with other apparatuses (such as, for example, a router) located relatively in the vicinity of the apparatus via a wireless network on the basis of standards such as Wi-Fi (registered trademark) and Bluetooth (registered trademark). With such a configuration, the terminal apparatus 300 can connect to a predetermined network (such as, for example, the Internet) via other apparatuses such as, for example, a router, and can transmit and receive information to and from the information processing apparatus 100 via the network.

Further, the communication unit 310 may be configured to be able to be connected to a network such as the Internet via a wired network.

The output unit 320 corresponds to output interface for outputting various kinds of information to the user. For example, the output unit 320 may include a display unit such as a display. By this means, the output unit 320 can present various kinds of information to the user by displaying display information such as, for example, a still image and a moving image. Further, the output unit 320 may include an audio output unit such as a speaker. By this means, the output unit 320 can present various kinds of information to the user, for example, by outputting speech and audio. Of course, the above is merely an example, and a method for presenting information to the user is not particularly limited, and a configuration in accordance with the method may be included in the output unit 320.

The input unit 330 corresponds to input interface for accepting input of information from the user. For example, the input unit 330 may include an input device such as a touch panel, a mouse and a keyboard. By this means, the user can input desired information to the terminal apparatus 300 by operating the input device. Further, the input unit 330 may include a sound collecting device for collecting audio in an external environment (that is, audio which propagates through the external environment and reaches), like a so-called microphone. By this means, the user can, for example, input desired information to the terminal apparatus 300 through utterance. Of course, the above is merely an example, and a method for accepting input of information from the user is not particularly limited, and a configuration in accordance with the method may be included in the input unit 330.

The storage unit 340 is a storage area for temporarily or permanently storing various kinds of data. For example, in the storage unit 340, data to be used by the terminal apparatus 300 to execute various kinds of functions may be stored. As a specific example, in the storage unit 340, data (for example, library) for executing various kinds of application or management data for managing various kinds of settings or the like, may be stored, for example. Further, in the storage unit 340, data of various kinds of content (for example, content distributed from the information processing apparatus 100) may be temporarily or permanently stored.

The control unit 350 is a component for controlling various kinds of operation of the terminal apparatus 300. The control unit 350 includes, for example, a communication control unit 351, a content acquiring unit 353, and an input/output control unit 355.

The communication control unit 351 controls communication with other apparatuses via a predetermined network. For example, the communication control unit 351 may acquire data (for example, content) transmitted from other apparatuses (for example, the information processing apparatus 100) by controlling the communication unit 310. Further, the communication control unit 351 may transmit various kinds of data (for example, content) to other apparatuses via a predetermined network by controlling the communication unit 310. By this means, for example, as illustrated in FIG. 1, the terminal apparatus 300 can transmit and receive information to and from the information processing apparatus 100 via the network N11. Note that, in the following, unless specified otherwise, in a case where each component within the terminal apparatus 300 transmits and receives information to and from other apparatuses, transmission and reception of the information are realized on the basis of control of the communication unit 310 by the communication control unit 351.

The content acquiring unit 353 acquires content from other apparatuses via a predetermined network. For example, the content acquiring unit 353 may acquire content transmitted from the information processing apparatus 100 via the network N11. Further, like so-called streaming, in place of data itself of content, information for reproducing (that is, presenting) the content may be transmitted from the information processing apparatus 100. In this case, the content acquiring unit 353 may acquire the information for reproducing the content from the information processing apparatus 100. Note that, in the following description, unless specified otherwise, a case where "content is acquired" can include a case where information for reproducing content is acquired as well as a case where data itself of content is acquired. Further, unless specified otherwise, a case where "content is presented" can include a case where content is presented by utilizing information for reproducing the content like streaming, or the like, as well as a case where content is presented by utilizing data of the content.

The input/output control unit 355 performs control so that various kinds of information is presented to the user via the output unit 320. For example, in a case where content regarding a still image and a moving image is acquired from the information processing apparatus 100, the input/output control unit 355 may cause the still image and the moving image to be displayed at a display, or the like. Further, as another example, in a case where content regarding speech and audio (for example, content such as music) is acquired from the information processing apparatus 100, the input/output control unit 355 may cause a speaker, or the like, to output the speech and the audio.

Further, the input/output control unit 355 may accept information from the user via the input unit 330. In this event, the input/output control unit 355 may recognize an instruction from the user by analyzing an input result of the information from the user. Further, the input/output control unit 355 may transmit information based on input from the user to the information processing apparatus 100.

Note that a configuration of the above-described terminal apparatus 300 is merely an example, and does not necessarily limit the configuration of the terminal apparatus 300. For example, the terminal apparatus 300 may be configured to be able to execute functions other than the above-described functions, in which case, the terminal apparatus 300 may include components for realizing the functions. Further, among the above-described respective components of the terminal apparatus 300, part of the components may be provided outside the terminal apparatus 300. As a specific example, at least one component among the output unit 320, the input unit 330 and the storage unit 340 may be externally attached to the terminal apparatus 300.

An example of the functional configuration of the terminal apparatus 300 according to the present embodiment has been described above with reference to FIG. 2.

(Configuration Example of Information Processing Apparatus 100)

Figure 3:
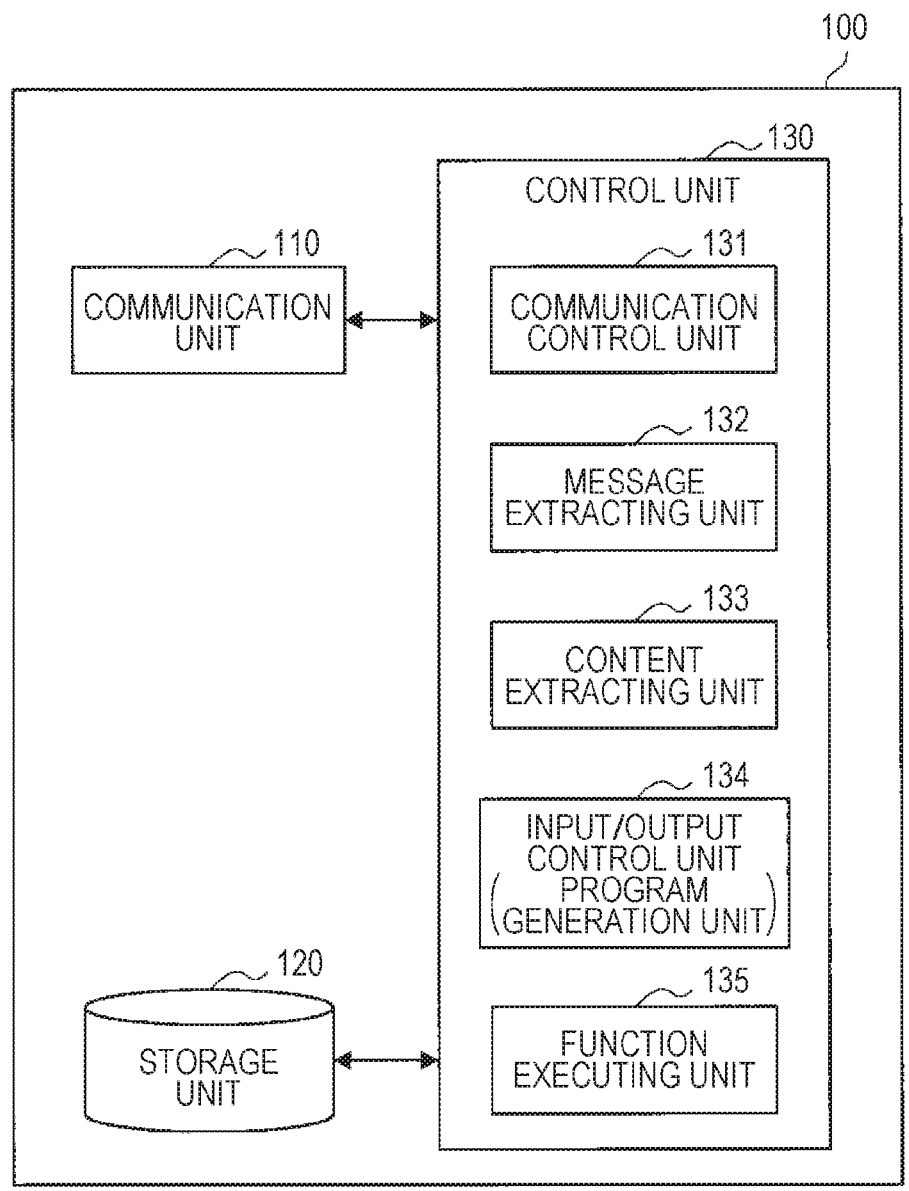
FIG. 3 is an explanatory diagram for explaining an example of a functional configuration of an information processing apparatus according to the embodiment.

Subsequently, an example of a functional configuration of the information processing apparatus 100 according to the present embodiment will be described with reference to FIG. 3. FIG. 3 is an explanatory diagram for explaining an example of the functional configuration of the information processing apparatus 100 according to the present embodiment.

As illustrated in FIG. 3, the information processing apparatus 100 includes a communication unit 110, a storage unit 120, and a control unit 130.

The communication unit 110 is a component for allowing each component of the information processing apparatus 100 to access a predetermined network and transmit and receive information to and from other apparatuses. Note that a type of the network accessed by the information processing apparatus 100 is not particularly limited. Therefore, the configuration of the communication unit 110 may be changed as appropriate according to the type of the network. This point is similar to that for the communication unit 310 in the terminal apparatus 300 mentioned above with reference to FIG. 2.

The storage unit 120 is a storage area for temporarily or permanently storing various kinds of data. For example, in the storage unit 120, data to be used by the information processing apparatus 100 to execute various kinds of functions may be stored. As a specific example, in the storage unit 120, data (for example, library) for executing various kinds of application or management data for managing various kinds of settings or the like, may be stored, for example. Further, in the storage unit 120, data of various kinds of content may be temporarily or permanently stored. Of course, the above is merely an example, and a type of the data stored in the storage unit 120 is not particularly limited.

The control unit 130 controls various kinds of operation of the information processing apparatus 100. For example, the control unit 130 includes a communication control unit 131, a message extracting unit 132, a content extracting unit 133, an input/output control unit 134, and a function executing unit 135.

The communication control unit 131 controls communication with other apparatuses via a predetermined network. For example, the communication control unit 131 may acquire data transmitted from other apparatuses (for example, the terminal apparatus 300) by controlling the communication unit 110. Further, the communication control unit 131 may transmit various kinds of data (for example, content) to other apparatuses via a predetermined network by controlling the communication unit 110. By this means, for example, as illustrated in FIG. 1, the information processing apparatus 100 can transmit and receive information to and from the terminal apparatus 300 via the network N11. Note that, in the following, unless specified otherwise, in a case where each component within the information processing apparatus 100 transmits and receives information to and from other apparatuses, transmission and reception of the information are realized on the basis of control of the communication unit 110 by the communication control unit 131.

The message extracting unit 132 extracts at least part of the messages D110 which satisfy predetermined conditions from one or more messages D110 which a desired user is notified of.

Note that, in the present disclosure, a type of the "message D110" is not particularly limited if the message is information which the user is notified of. Examples of the messages D110 which the user is notified of can include an email transmitted to the user, a message and the like transmitted to the user via message service or the like. Further, as another example, information of a notification, an advertisement, or the like, presented upon browsing of a web page and various kinds of content may be dealt with as the message D110 which the user is notified of. Of course, the above is merely an example, and a type of information (that is, the message D110) to be utilized for extracting content is not particularly limited if the information is information which the user is notified of.

Further, content indicated by "notification of the message D110" in the present disclosure may be read as appropriate in accordance with the type of the "message D110". For example, in a case where an email corresponds to the message D110 according to the present disclosure, operation relating to transmission of the email may be understood as "notification of the message D110". Further, in this case, notification is not limited by whether or not the user opens the email. Further, also in a case where a message transmitted via message service or the like corresponds to the message D110 according to the present disclosure, operation relating to transmission of the message via the message service may be understood as "notification of the message D110". Further, in a case where information which the user is notified of upon browsing of a web site, or the like, corresponds to the message D110 according to the present disclosure, operation for causing the information to be displayed at a browser, or the like, may be understood as "notification of the message D110".

For example, attention will be focused on a case where an email transmitted to the user is utilized as the message D110 according to the present disclosure. In this case, for example, the message extracting unit 132 may extract an email transmitted from a predetermined transmission source among a series of emails transmitted to the user. Further, as another example, the message extracting unit 132 may extract an email associated with content such as an email to which content is attached, and an email in which a link to content is presented, from the above-described series of emails. Further, the message extracting unit 132 may extract an email including content indicating predetermined intention such as "advertisement of content" and "suggestion of browsing content" from the above-described series of emails.

Further, as another example, attention will be focused on a case where a message transmitted to the user via message service is utilized as the message D110 according to the present disclosure. Also in this case, in a similar manner to a case where an email is utilized, it is possible to extract at least part of messages from a series of message transmitted to the user.

Further, in a case where a message is transmitted via message service, there is a case where content indicating intention such as "advertisement of content" and "suggestion of browsing content", and information (for example, a link) for browsing the content are transmitted as messages different from each other. Also in such a case, for example, it is also possible to extract a plurality of messages as a series of messages which are relevant to each other in accordance with relevance between the plurality of messages which is different from each other.

As a specific example, a plurality of messages having relationship that a difference in transmission periods is equal to or less than a threshold may be extracted as a series of messages which are relevant to each other. Further, as another example, relevance between a plurality of messages may be determined in accordance with content of the messages and content associated with the messages. As a specific example, it is also possible to determine that a message having intention of listening such as "please listen" is highly relevant to a message with which a music is associated as content. In a similar manner, it is also possible to determine that a message having intention of viewing such as "please view" is highly relevant to a message with which an image such as a moving image and a still image is associated as content. Further, a message portion and a content portion which are transmitted separately in advance may be associated with each other at a time point of transmission. Note that, in this case, a message indicating intention such as "advertisement of content" and "suggestion of browsing content" corresponds to an example of a "first message", and a message in which information for browsing the content is presented corresponds to an example of a "second message".

Note that conditions relating to the above-described extraction of messages may be individually set for each user. Particularly, in the information processing system according to the present embodiment, it is possible to extract the message D110 relating to content which suits the preference of the user better (such as, for example, content relating to the user's favorite artist) by setting conditions personalized in further details for each user.

In a case where the message extracting unit 132 extracts the message D110 as described above, the message extracting unit 132 outputs information based on an extraction result of the message D110 to the content extracting unit 133. Note that the message extracting unit 132 corresponds to an example of an "extracting unit".

The content extracting unit 133 acquires information based on the extraction result of the message D110 from the message extracting unit 132 and extracts content associated with at least part of messages D110 among the extracted one or more messages D110.

For example, the content extracting unit 133 may extract content attached to the message D110 such as an email. Further, as another example, the content extracting unit 133 may acquire content of a link destination on the basis of a link described in the message D110.

Then, the content extracting unit 133 outputs information based on the extraction result of the content and the message D110 relating to the content to the input/output control unit 134.

The input/output control unit 134 acquires information based on the extraction result of the content and the message D110 relating to the content, from the content extracting unit 133 and controls operation relating to presentation of the content to the user in accordance with the acquired information. In this event, the input/output control unit 134 extracts information regarding the content from the message D110 relating to the content. Note that the extracted information is utilized as information for explaining the content to the user, such as, for example, introduction of the content. Then, the input/output control unit 134 generates a series of content for presenting the content to the user on the basis of the above-described content and the information extracted from the message D110 relating to the content. Further, in this event, the input/output control unit 134 may generate a series of content for presenting each of a plurality of pieces of content to the user on the basis of the plurality of pieces of content and respective pieces of information extracted from messages respectively relating to the plurality of pieces of content. Note that, in the following description, the series of content will be also referred to as a "program V10". Further, processing relating to generation of the program V10 will be described in detail later. Note that a portion relating to generation of the program V10 in the input/output control unit 134 corresponds to an example of a "generating unit". Further, the program V10 corresponds to an example of "second content", and each piece of content included in the program V10 corresponds to an example of "first content".

The input/output control unit 134 controls operation relating to output of the program V10 so that the generated program V10 is presented to the user via a predetermined output unit. As a specific example, the input/output control unit 134 may cause the terminal apparatus 300 to present the program V10 by transmitting the generated program V10 (that is, content) to the terminal apparatus 300. Note that a portion relating to presentation of the program V10 in the input/output control unit 134 corresponds to an example of a "first control unit".

Further, the input/output control unit 134 may acquire information based on input from the user via a predetermined input unit and may perform control so that processing appropriate for the information is executed. As a specific example, the input/output control unit 134 may acquire information based on input from the user to the terminal apparatus 300 from the terminal apparatus 300. Further, the input/output control unit 134 may control processing to be executed in accordance with a situation concerning presentation of content (for example, the above-described program V10) in a case where information based on input from the user is acquired. As a specific example, the input/output control unit 134 may specify processing relating to content which is being reproduced as processing to be executed. Further, in this event, the input/output control unit 134 may perform control so that feedback in accordance with an execution result of the processing is presented to the user via a predetermined output unit. Note that control of the processing to be executed in accordance with a situation concerning presentation of the content will be described in detail later. Further, a portion relating to control of the processing to be executed in accordance with a situation concerning presentation of the content in the input/output control unit 134 corresponds to an example of a "second control unit". Further, portions respectively relating to the first control unit and the second control unit in the input/output control unit 134 may be individually provided.

The function executing unit 135 is a component for executing various kinds of functions provided by the information processing apparatus 100. For example, the function executing unit 135 may execute various kinds of application on the basis of library, setting information, or the like, stored in the storage unit 120 in accordance with a predetermined trigger. As a specific example, the function executing unit 135 may execute a function in accordance with an instruction from the input/output control unit 134. Further, the operation of the function executing unit 135 may be, for example, controlled by the above-described input/output control unit 134 on the basis of information based on input from the user.

Note that the above-described configuration of the information processing apparatus 100 is merely an example, and does not necessarily limit the configuration of the information processing apparatus 100. For example, part of components of the information processing apparatus 100 illustrated in FIG. 3 may be provided outside the information processing apparatus 100. As a specific example, the storage unit 120 may be provided outside the information processing apparatus 100. Further, as another example, part of components included in the control unit 130 may be provided at other apparatuses different from the information processing apparatus 100. Further, as a still another example, the respective functions of the information processing apparatus 100 may be realized by a plurality of apparatuses operating in coordination with each other.

An example of the functional configuration of the information processing apparatus 100 according to the present embodiment has been described above with reference to FIG. 3.

3. PROCESSING

Subsequently, an example of processing of the information processing system according to the present embodiment will be described.

3.1. Outline of Processing Relating to Generation of Program

Figure 6:
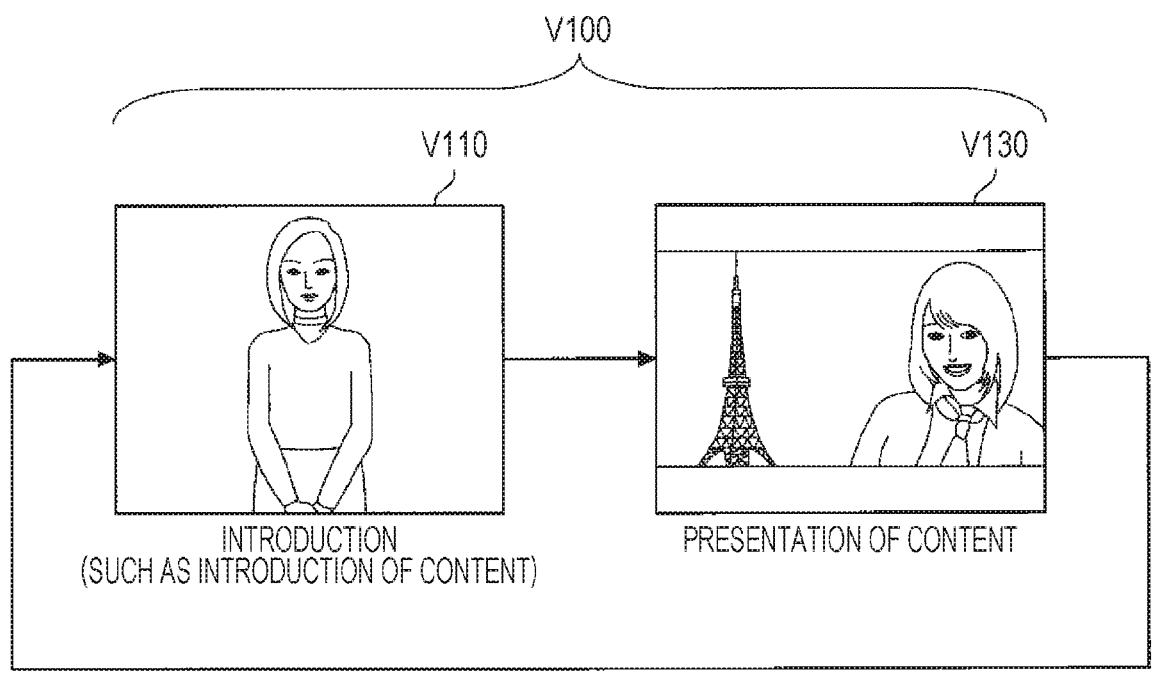
FIG. 6 is an explanatory diagram for explaining an example of processing relating to generation of a program by the information processing system according to the embodiment.

First, outline of processing relating to generation of the program V10 by the information processing system according to the present embodiment will be described with reference to FIG. 4 to FIG. 6.

Figure 4:
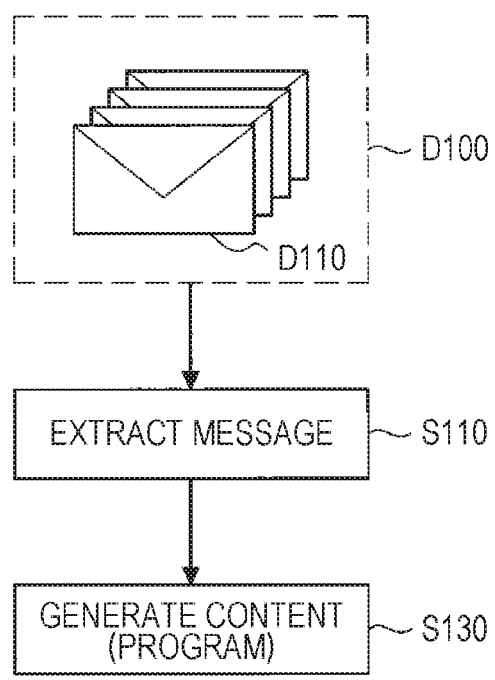
FIG. 4 is an explanatory diagram for explaining an example of a flow of processing relating to generation of a program by the information processing system according to the embodiment.

For example, FIG. 4 is an explanatory diagram for explaining an example of a flow of processing relating to generation of the program V10 by the information processing system according to the present embodiment. In the information processing system 1 according to the present embodiment, the information processing apparatus 100 extracts at least part of messages D110 to be utilized for generation of the program V10 from a message group D100 including one or more messages D110 transmitted to a desired user (user to which the program V10 is to be presented) on the basis of predetermined conditions (S110). Then, the information processing apparatus 100 extracts content associated with at least part of messages D110 among the extracted one or more messages D110 and generates the program V10 on the basis of the extraction result of the content (S130).

Here, an example of processing relating to extraction of a message will be described with reference to FIG. 5. FIG. 5 is an explanatory diagram for explaining an example of processing relating to extraction of a message to be utilized for generation of the program V10 by the information processing system according to the present embodiment.

For example, the message D110 which has been opened by the user in the past (that is, a read message) is highly likely to include information whose content has been confirmed by the user, and priority of the information is often lower for the user than that of other information. Therefore, for example, the information processing apparatus 100 may extract messages from messages D110 (that is, unread messages) which are not opened among a series of messages D110 (that is, the message group D100) which the user is notified of. Note that the unread messages are not limited only to messages which are not simply referred to by the user, but can include, for example, messages which require active confirmation by the user (or messages which can be confirmed only by active operation) as a result of setting the messages not to be notified.

Further, the information processing apparatus 100 may extract at least part of messages D110 from the message group D100 in accordance with a transmission source (notification source) of the messages D110. As a specific example, the information processing apparatus 100 may set messages D110 transmitted from official accounts set for an actor, a musician, or the like, as a target of extraction. There is a case where content relating to the actor or the musician, such as a moving image for advertising a movie in which the above-described actor appears and a sample of a music of the above-described musician, is associated with the messages D110 extracted on the basis of such conditions. In contrast, the information processing apparatus 100 may exclude messages D110 transmitted from general users from the target of extraction.

Further, the information processing apparatus 100 may perform extraction while setting messages D110 having predetermined intention, such as "come to the live", "watch the TV program", "watch the moving image", "buy the product", "listen to the music", and "watch the movie" as a target of extraction. There is a case where content is associated with the messages D110 extracted on the basis of such conditions as a target for which the intention is indicated. In contrast, the information processing apparatus 100 may exclude messages D110 which do not have predetermined intention, such as chat, from the target for extraction.

Further, the information processing apparatus 100 may extract messages D110 in accordance with the preference of the user who becomes a target. As a specific example, the information processing apparatus 100 may preferentially extract messages D110 transmitted from official accounts of the user's favorite actor and musician. Further, the information processing apparatus 100 may set, as a target for extraction, messages D110 regarding an announcement of a music among the messages D110 transmitted from an official account of the user's favorite musician, and may exclude messages D110 regarding an announcement of an event such as a live from the target for extraction. Note that it is possible to realize the above-described control by, for example, causing the information processing apparatus 100 to learn the preference of the user by utilizing machine learning, or the like.

Further, the information processing apparatus 100 may extract messages D110 in accordance with conditions regarding a timing such as a period and a time slot.

Further, the information processing apparatus 100 may extract messages D110 with which content which can be utilized for generation of the program V10 is associated. As a specific example, the information processing apparatus 100 may extract messages D110 to which content is attached and messages D110 in which a link to content is presented.

Subsequently, an example of processing relating to generation of the program V10 will be described with reference to FIG. 6. FIG. 6 is an explanatory diagram for explaining an example of processing relating to generation of the program V10 by the information processing system according to the present embodiment.

The information processing apparatus 100 specifies a message D110 relating to content from one or more messages D110 extracted from the message group D100 and extracts the message D110 and the content. The information processing apparatus 100 extracts information regarding the extracted content from the extracted message D110 and generates information for explaining the content to the user (such as, for example, introduction of the content) on the basis of the information. Then, the information processing apparatus 100 generates an MC portion V110 which becomes an introduction portion of the program V10 on the basis of the information for explaining the content. The MC portion V110 may be generated as data for causing a virtual character such as an agent who hosts the program V10 to utter speech data which is generated by synthesizing speech such as introduction of the content on the basis of the information extracted from the message D110, for example. Note that information regarding the content extracted from the message D110, presented at the MC portion V110 corresponds to an example of "information based on content of the message".

Further, the information processing apparatus 100 generates a block V100 for presenting the content extracted from the message D110 (hereinafter, also referred to as "content C1") by synthesizing the generated MC portion V110 and the content C1. For example, in the example illustrated in FIG. 5, the block V100 is generated so that, first, the MC portion V110 is presented, then, a portion relating to presentation of the content (such as, for example, a reproduction screen) is displayed, and the content C1 is presented (for example, reproduced). Note that, hereinafter, the portion relating to presentation of the content such as a reproduction screen will be also referred to as a "content presenting portion V130". The program V10 according to the present embodiment is generated so as to include one or more blocks V100 generated in this manner. As a specific example, the information processing apparatus 100 may generate one program V10 by generating the blocks V100 for respective plurality of pieces of content C1 and arranging the generated plurality of blocks V100 in chronological order so as to be sequentially presented. By this means, it is, for example, possible to generate a series of program V10 (that is, content) including a plurality of pieces of content C1.

As described above, the information processing apparatus 100 according to the present embodiment may, for example, generate the program V10 for reproducing the content C1 extracted from the message D110 as a moving image. Note that, in this event, the information processing apparatus 100 may generate the program V10 by embedding the content presenting portion V130 in which the content C1 is presented as a partial image, in part of a screen of the MC portion V110. In a similar manner, the information processing apparatus 100 may generate the program V10 by embedding a screen of the MC portion V110 as a partial image in part of the content presenting portion V130 in which the content C1 is presented.

Further, the program V10 generated by the information processing apparatus 100 is not limited to a moving image. For example, the information processing apparatus 100 may generate the program V10 for presenting the content C1 as speech and audio. In this case, for example, the information processing apparatus 100 may generate the MC portion V110 as speech data and may generate the program V10 on the basis of the MC portion V110 (speech data) and a portion of audio data among the content C1. In this manner, in the information processing system according to the present embodiment, if the program V10 is generated as content in which information is presented in chronological order, a type of the content is not particularly limited.

The program V10 (content) generated as described above is, for example, presented at the terminal apparatus 300 after the program V10 is transmitted to the terminal apparatus 300.

Note that the information processing apparatus 100 may make various kinds of settings (that is, settings regarding interaction) for realizing interaction with the user on the program V10 in accordance with input of information from the user during presentation of the program V10. As a specific example, the information processing apparatus 100 may make various kinds of settings regarding an instruction which can be accepted from the user during presentation of the program V10 (content) and processing to be executed in accordance with the instruction, on the program V10. Further, the information processing apparatus 100 may control a type of interaction to be set for the program V10 in accordance with a type of the content C1 included in the program V10. Note that an example of operation regarding the interaction will be described in detail later.

Outline of processing relating to generation of the program V10 by the information processing system according to the present embodiment has been described above with reference to FIG. 4 to FIG. 6.

3.2. Flow of Series of Processing

Figure 7:
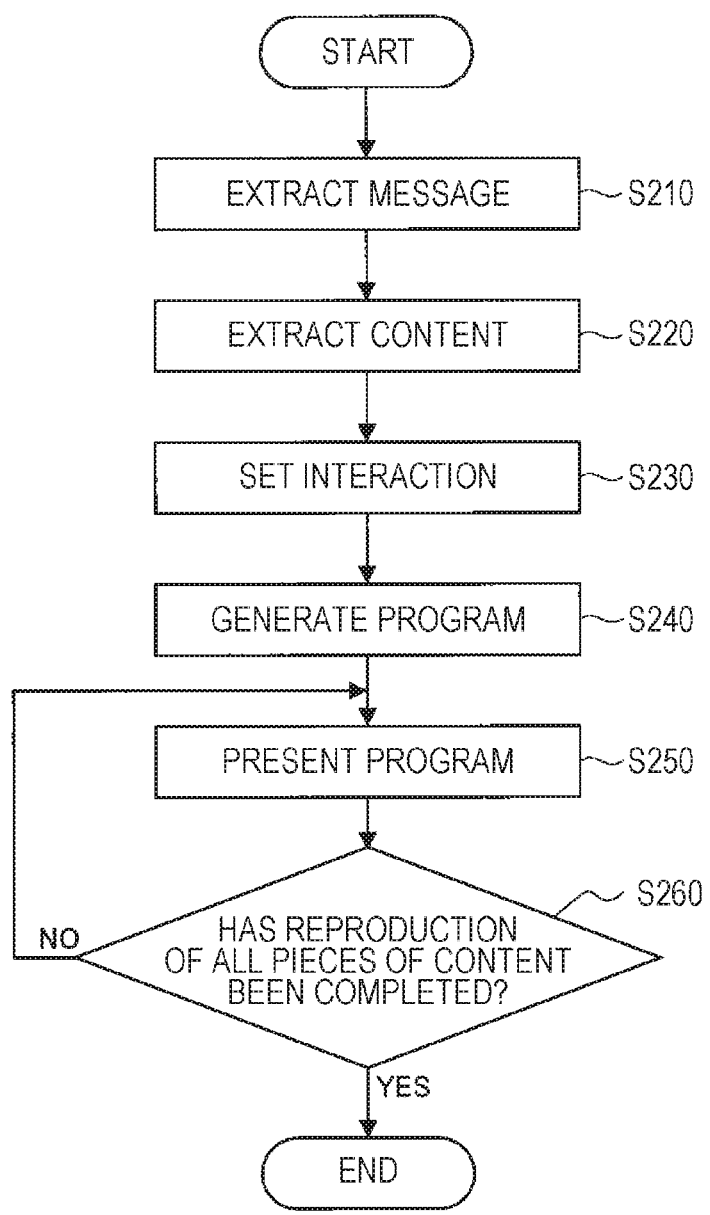
FIG. 7 is a flowchart illustrating an example of a flow of a series of processing of the information processing system according to the embodiment.

Subsequently, an example of a flow of a series of processing relating to generation of the program V10 and presentation of the program V10 in the information processing system according to the present embodiment will be described with reference to FIG. 7. FIG. 7 is a flowchart illustrating an example of the flow of the series of processing of the information processing system according to the present embodiment.

As illustrated in FIG. 7, first, the information processing apparatus 100 extracts at least part of the messages D110 to be utilized for generation of the program V10 from one or more messages D110 transmitted to the user to whom the program V10 is to be presented, on the basis of predetermined conditions (S210). Then, the information processing apparatus 100 specifies a message D110 relating to the content C1 from the extracted one or more messages D110 and extracts the message D110 and the content C1 (S220). Further, the information processing apparatus 100 may make settings regarding interaction in accordance with the extracted content C1 (V230).

The information processing apparatus 100 extracts information regarding the content C1 from the extracted message D110 (that is, the message D110 relating to the content C1) and generates the MC portion V110 corresponding to the content C1 on the basis of the extracted information. Further, the information processing apparatus 100 generates the block V100 on the basis of the generated MC portion V110 and the content C1 corresponding to the MC portion V110. Then, the information processing apparatus 100 generates the program V10 on the basis of one or more blocks V100 generated on the basis of the extraction result of the content C1 (S240).

Then, the information processing apparatus 100 causes the terminal apparatus 300 to present the generated program V10 (S250). For example, the information processing apparatus 100 may cause the terminal apparatus 300 to present the program V10 on the basis of data of the generated program V10 by transmitting the data to the terminal apparatus 300. Further, as another example, the information processing apparatus 100 may cause the terminal apparatus 300 to reproduce the program V10 on the basis of information for reproducing the generated program V10 by transmitting the information to the terminal apparatus 300, as in so-called streaming. Note that processing relating to presentation of the program V10 is sequentially executed until presentation of all pieces of the content C1 included in the program V10 is completed (S260: No). Then, if presentation of all pieces of the content C1 included in the program V10 is completed (S260: Yes), the terminal apparatus 300 finishes processing relating to presentation of the program V10.

An example of the flow of the series of processing relating to generation of the program V10 and presentation of the program V10 in the information processing system according to the present embodiment has been described above with reference to FIG. 7.

4. MODIFIED EXAMPLES

Subsequently, modified examples of the information processing system according to the present embodiment will be described.

4.1. Modified Example 1: Example of Presentation Mode of Program

Figure 8:
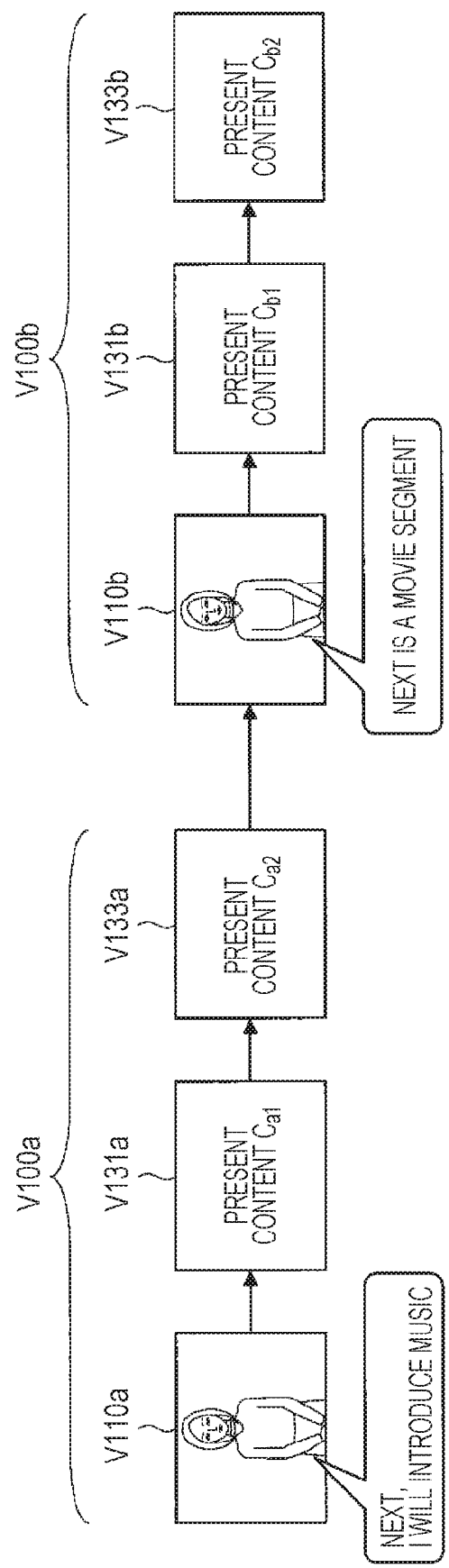
FIG. 8 is an explanatory diagram for explaining outline of an information processing system according to Modified Example 1.

First, an example of a presentation mode of the program V10 will be described as Modified Example 1. For example, FIG. 8 is an explanatory diagram for explaining outline of an information processing system according to Modified Example 1, and illustrates an example of the presentation mode of the program V10 according to the present embodiment.

As mentioned above, the program V10 according to the present embodiment includes one or more blocks V100. For example, in the example illustrated in FIG. 5, the program V10 includes blocks V100a and V100b. In this event, at least part of blocks V100 among one or more blocks V100 constituting the program V10 may include a plurality of pieces of content C1 (that is, a plurality of pieces of content C1 may be presented in one block V100).

For example, in the example illustrated in FIG. 5, the block V100a includes content $C_{a1}$ and $C_{a2}$ as indicated with reference numerals V131a and V133a. In this case, the MC portion V110a of the block V100a may be generated on the basis of information extracted from messages D110 respectively relating to the content $C_{a1}$ and $C_{a2}$. That is, at the MC portion V110a, information respectively relating to the content $C_{a1}$ and $C_{a2}$ (such as, for example, introduction of each of the content $C_{a1}$ and $C_{a2}$) may be output using speech, or the like. Further, after the MC portion V110a is presented, as indicated as content presenting portions V131a and V133a, the content $C_{a1}$ and $C_{a2}$ may be respectively sequentially presented.

Similarly, the block V100b includes content $C_{b1}$ and $C_{b2}$ as indicated with reference numerals V131b and V133b. In this case, the MC portion V110b of the block V100b may be generated on the basis of information extracted from messages D110 respectively relating to the content $C_{b1}$ and $C_{b2}$. That is, at the MC portion V110b, information respectively relating to the content $C_{b1}$ and $C_{b2}$ may be output using speech, or the like. Further, after the MC portion V110b is presented, as indicated as content presenting portions V131b and V133b, the content $C_{b1}$ and $C_{b2}$ may be respectively sequentially presented.

Further, in the example illustrated in FIG. 5, the information processing apparatus 100 may classify one or more pieces of content into one or more groups in accordance with predetermined conditions and may generate the block V100 for each group so as to include the content C1 allocated to the group. For example, in the example illustrated in FIG. 5, the information processing apparatus 100 classifies a plurality of pieces of content for each type of the content. Specifically, the information processing apparatus 100 allocates the content $C_{a1}$ and $C_{a2}$ of a music in a common group to generate a block V100a corresponding to the group. In this case, in a MC portion V110a of the block V100a, explanation that the content of the music will be presented may be provided. Further, the information processing apparatus 100 allocates content $C_{b1}$ and $C_{bz}$ of a movie in a common group to generate a block V100b corresponding to the group. In this case, in an MC portion V110b of the block V100b, explanation that the content of the movie will be presented may be provided.

Of course, the above-described example is merely an example, and a condition for classifying one or more pieces of content into one or more groups is not necessarily limited to the example illustrated in FIG. 8.

An example of the presentation mode of the program V10 has been described above as Modified Example 1 with reference to FIG. 8.

4.2. Modified Example 2: Example of Method for Realizing Interaction

Subsequently, an example of a method for realizing interaction with the user during presentation of the program V10 according to the present embodiment will be described as Modified Example 2. Note that, in the present modified example, a case will be described where as a medium for realizing interaction between the user and the information processing system according to the present embodiment (in other words, the program V10 according to the present embodiment), speech uttered by the user is utilized. As a specific example, it is assumed that, in the information processing system according to Modified Example 2, the program V10 is, for example, configured so that the user can give various kinds of instructions through dialogue with an agent appearing in the program V10 (for example, a character who is in charge of a host).

For example, in the information processing system according to the present modified example, various kinds of operation in accordance with the content presented in the program V10 may be provided. As a specific example, it is assumed that, at the MC portion V110 within the program V10, information indicating that "program A will be broadcasted at 9 o'clock tonight" is presented to the user as introduction of the TV program. Under such a situation, for example, there is a possibility that the user "desires to watch the introduced program A", and it is assumed that the user gives an instruction of recording the program A, that is, "record the program", an instruction regarding settings of a timer and schedule, that is, "tell me when it is time", or the like.

Under a situation where the user gives an instruction through utterance, there is a case where information of part of content of the utterance is implicitly expressed. For example, in a case where the user utters "record the program", a target of recording is not implicitly expressed only with the uttered phrase. Meanwhile, under a situation where the TV program A is introduced by the program V10, it can be estimated that a target of recording for which the user gives an instruction is the TV program A.

Therefore, the information processing system according to Modified Example 2 (for example, the information processing apparatus 100) analyzes content of the message D110 corresponding to the content C1 presented in the program V10 and utilizes the analysis result to interpret content uttered by the user who is viewing the program V10.

As a specific example, there is a case where it is possible to estimate a type of content which becomes a target from messages indicating intention, such as "watch the movie", "watch TV", and "listen to the music" among the messages D110. Further, as a result of the type of the content being recognized, it becomes also possible to specify information to be extracted from the message D110 in accordance with interaction assumed to be performed with the user to whom the content is to be presented. Further, in a case where it is difficult to extract all information necessary for realizing interaction from the message D110, for example, by searching a database, or the like, on the basis of partial information, it becomes also possible to interpolate insufficient information.

For example, as in the example mentioned above, it is assumed that the content C1 regarding the TV program A (for example, content of introduction of the program) is presented, as introduction of the TV program A by the program v10. In this case, for example, the information processing apparatus 100 may recognize that the content C1 is content regarding the TV program by recognizing a message indicating intention of "guiding the user to view the TV program", or the like, in the message D110 relating to the content C1. By this means, the information processing apparatus 100 can set interaction of recording the TV program A in a case where an instruction to record the program is received from the user. Further, the information processing apparatus 100 may recognize information regarding the TV program A such as broadcast time of the TV program A by recognizing a message indicating that "the TV program A will be broadcasted from 9 o'clock" in the message D110 relating to the content C1. By this means, the information processing apparatus 100 can set interaction so that processing is to be executed at 9 o'clock in a case where an instruction regarding settings of a timer and schedule is received from the user.

Further, as another example, in a case where the user utters "want a ticket" in a situation where a sample of the movie is presented to the user, the utterance indicates that the user wants a ticket of the movie presented as the sample. In this case, the information processing apparatus 100 may, for example, recognize that "the message D110 is an advertisement of the movie", "the title of the movie" and that "a target of the utterance of the user during presentation of the sample is related to the movie" by analyzing the related message D110. Through such processing, for example, in a case where the user utters "want to buy a ticket" during presentation of the sample of the movie, the information processing apparatus 100 can recognize that the user desires to purchase a ticket of the movie and can guide the user to service for purchasing a ticket.

Figure 9:
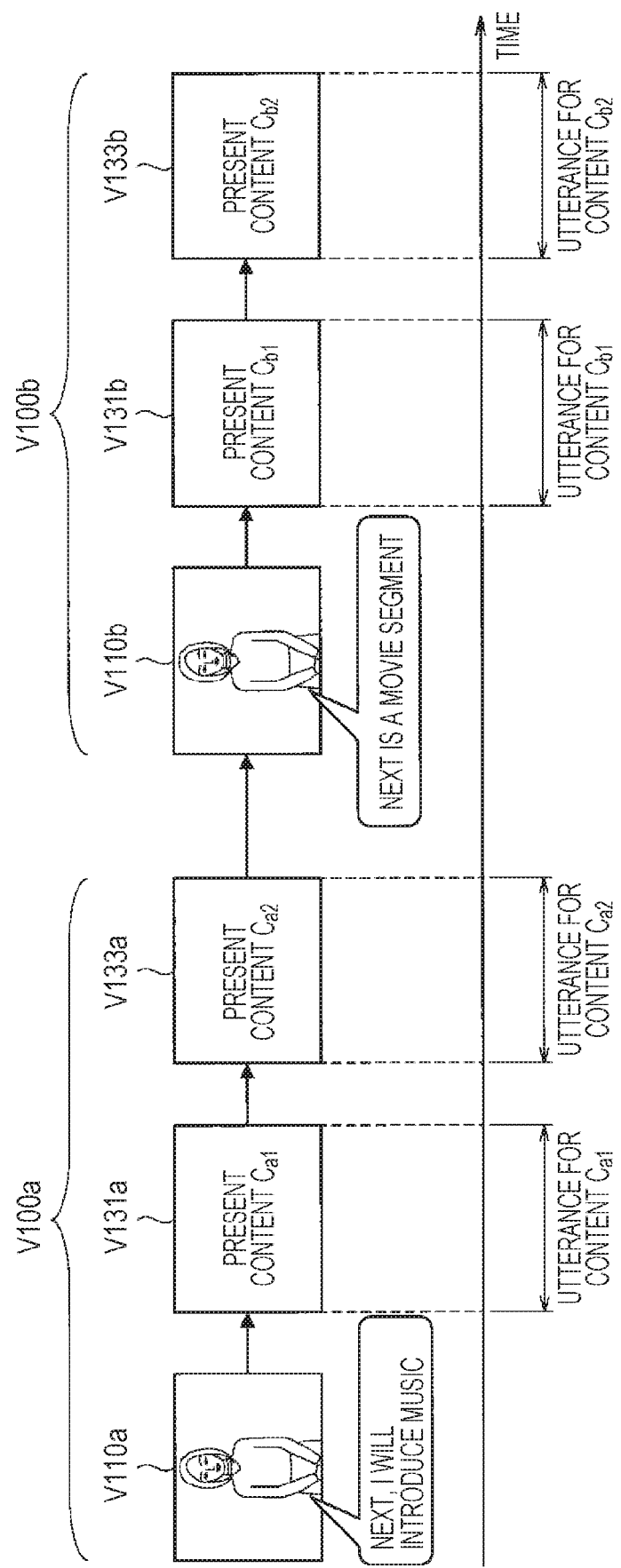
FIG. 9 is an explanatory diagram for explaining outline of an information processing system according to Modified Example 2.

Here, relationship between a timing of utterance (that is, a timing at which input is accepted from the user) and processing to be executed in response to the utterance in a case where the user gives utterance during presentation of the program V10 will be described with reference to FIG. 9. FIG. 9 is an explanatory diagram for explaining outline of an information processing system according to Modified Example 2. FIG. 9 illustrates an example of a case where the user gives utterance during presentation (for example, reproduction) of the program V10 described with reference to FIG. 8. That is, in the example illustrated in FIG. 9, as the program V10, the block V100a in which the content $C_{a1}$ and $C_{a2}$ regarding the music is presented and the block V100b in which the content $C_{b1}$ and $C_{b2}$ regarding the movie is presented are sequentially presented in this order.

In this case, for example, in a case where the user gives utterance during presentation of the content $C_{a1}$ (that is, during presentation by the content presenting portion V131a), the information processing apparatus 100 recognizes that a target of the utterance is the content $C_{a1}$. Further, the information processing apparatus 100 can set various kinds of interaction regarding the content $C_{a1}$ in advance as interaction which can be realized during presentation of the content $C_{a1}$. This is similar for other content $C_{a2}$, $C_{b1}$ and $C_{b2}$. That is, in a case where the user gives utterance during presentation by each of the content presenting portions V133a, V131b and V133b, the targets of the utterance are respectively recognized as the content $C_{a2}$, $C_{b1}$ and $C_{b2}$. Note that, in this event, the information processing apparatus 100 may shift correspondence relationship between a period during which the content is presented (for example, a reproduction period) and a timing of recognition of the utterance in chronological order while taking into account delay, or the like, of various kinds of processing.

Figure 10:
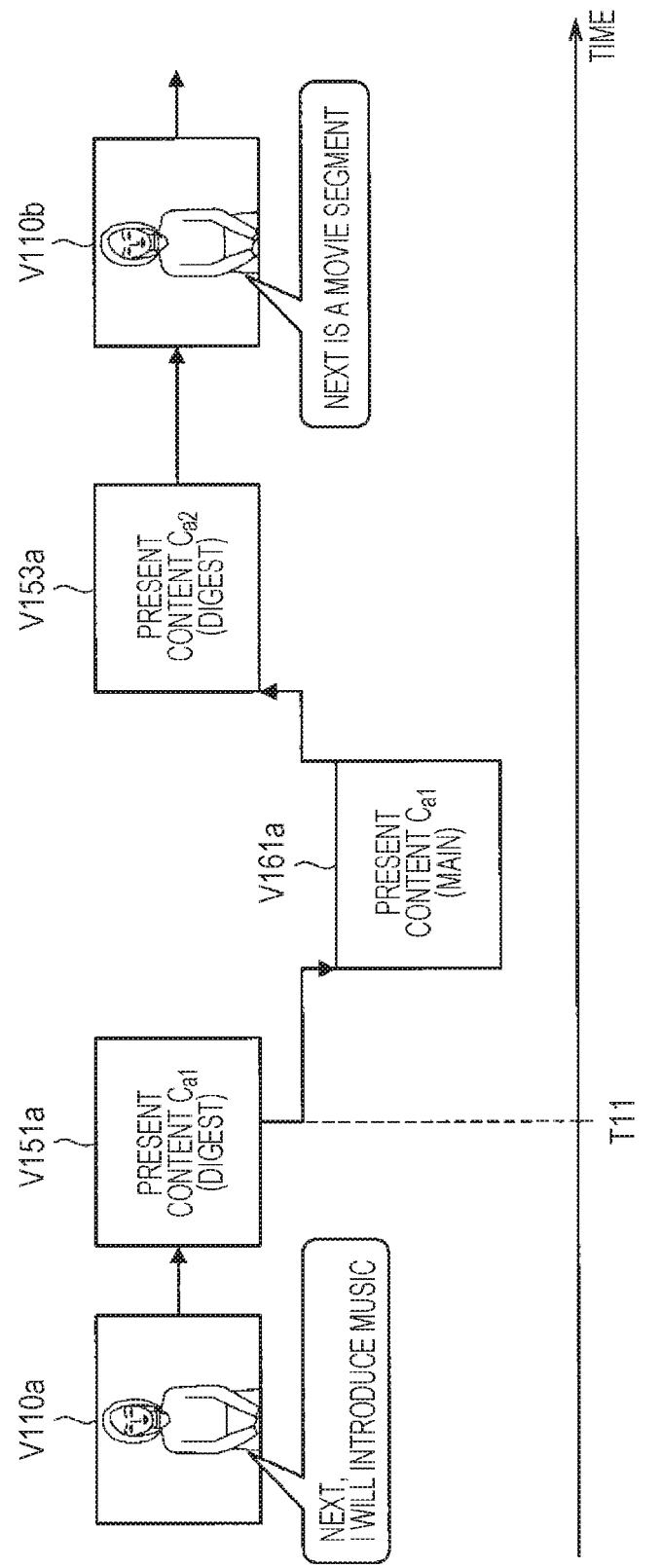
FIG. 10 is an explanatory diagram for explaining an example of interaction to be realized by the information processing system according to Modified Example 2.

An example of interaction in accordance with the utterance of the user will be described next with reference to FIG. 10. FIG. 10 is an explanatory diagram for explaining an example of interaction to be realized by the information processing system according to Modified Example 2.

In the example illustrated in FIG. 10, the program V10 is configured so that, after the MC portion V110a is presented, the content presenting portions V151a and V153a in which digests (for example, portions of the beginning) of respective pieces of content $C_{a1}$ and $C_{a2}$ are presented in this order.

In the example illustrated in FIG. 10, for example, it is assumed that, at a timing T11 during presentation of the digest of the content $C_{a1}$ (that is, during presentation by the content presenting portion V151a), the user gives utterance requesting presentation of further detailed information. In this case, for example, the information processing apparatus 100 may interrupt processing relating to presentation (reproduction) of the digest of the content $C_{a1}$ (that is, presentation by the content presenting portion V151a) and may start presentation of the main of the content $C_{a1}$ as indicated with a reference numeral V161a. Further, in a case where the content is a music, or the like, the information processing apparatus 100 may control operation relating to reproduction of the content so that continuity of reproduction of the content is maintained when transition from reproduction of the digest of the content to reproduction of the main of the content is made (that is, reproduction seamlessly transitions from the digest to the main).

Further, the information processing apparatus 100 may control presentation of the program V10 so that, after the main of the content $C_{a1}$ is presented in response to the instruction from the user, reproduction is not made to return to the interrupted reproduction of the digest of the content $C_{a1}$, and the digest of the next content $C_{a2}$ is reproduced. That is, in a case where processing relating to the content which is being presented (for example, reproduction of the main) is executed in response to the instruction from the user, the information processing apparatus 100 may perform control so that processing relating to presentation of other content is started while regarding the processing relating to presentation of the content as being finished.

Figure 11:
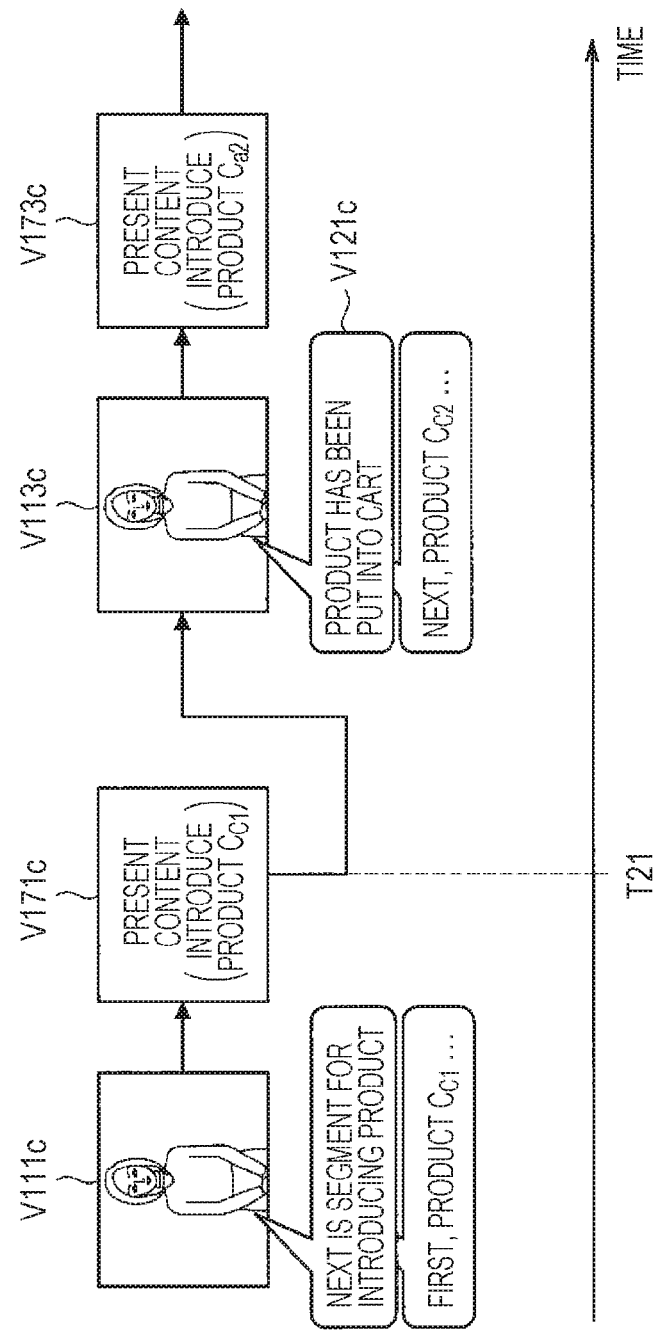
FIG. 11 is an explanatory diagram for explaining an example of interaction to be realized by the information processing system according to Modified Example 2.

An example of interaction in a case where the program V10 according to the present embodiment is applied to introduction of a product or mail-order sale of the product will be described next with reference to FIG. 11. FIG. 11 is an explanatory diagram for explaining an example of interaction to be realized by the information processing system according to Modified Example 2, and illustrates an example in a case where a program of mail-order sale is simulated by the program V10 according to the present embodiment.

In the example illustrated in FIG. 11, the program V10 is configured so that content (for example, moving images) relating to introduction of respective products $C_{c1}$ and $C_{c2}$ is sequentially presented. Specifically, a portion relating to introduction of the product $C_{c1}$ (for example, the block V100) includes an MC portion V111c and a content presenting portion (that is, a content presenting portion V171c) relating to introduction of the product $C_{C1}$. In a similar manner, a portion relating to introduction of the product $C_{c2}$ includes an MC portion V113c and a content presenting portion V173c relating to introduction of the product $C_{c2}$. Under such a configuration, the portion relating to introduction of the product $C_{c1}$ (that is, the MC portion V111c and the content presenting portion V171c) and the portion relating to introduction of the product $C_{c2}$ (that is, the MC portion V113c and the content presenting portion V173c) are sequentially presented in this order.

In the example illustrated in FIG. 11, for example, it is assumed that, at a timing T21 during presentation of the content regarding introduction of the product $C_{c1}$ (that is, during presentation by the content presenting portion V171c), the user gives utterance indicating an instruction to put the product into a cart. In this case, the information processing apparatus 100 may interrupt processing relating to presentation by the content presenting portion V171c and may start introduction of the next product $C_{c2}$ after executing processing of putting the product $C_{c1}$ which is being introduced into a cart. Further, in this event, the information processing apparatus 100 may make a notification indicating that the product $C_{c1}$ which has been introduced before is put into a cart as indicated with a reference numeral V121c at the MC portion V113c in which the next product $C_{c2}$ is introduced, for example.

Figure 12:
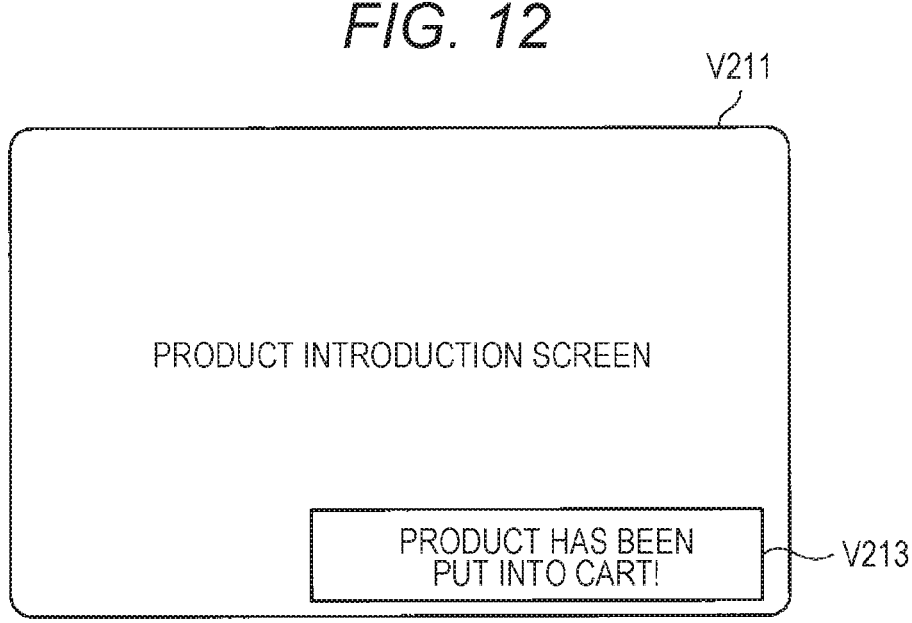
FIG. 12 is an explanatory diagram for explaining an aspect of interaction to be realized by the information processing system according to Modified Example 2.

Further, as another example, in a case where the user gives utterance indicating an instruction to put the product into a cart, the information processing apparatus 100 may make a notification that the product which is being introduced is put into a cart without interrupting reproduction of the content regarding introduction of the product. For example, FIG. 12 is an explanatory diagram for explaining an aspect of the interaction to be realized by the information processing system according to Modified Example 2, and illustrates an example of interaction in a case where an instruction to put the product into a cart is given. In the example illustrated in FIG. 12, a message V213 indicating that the product is put into a cart is presented at part of a product introduction screen V211.

Figure 13:
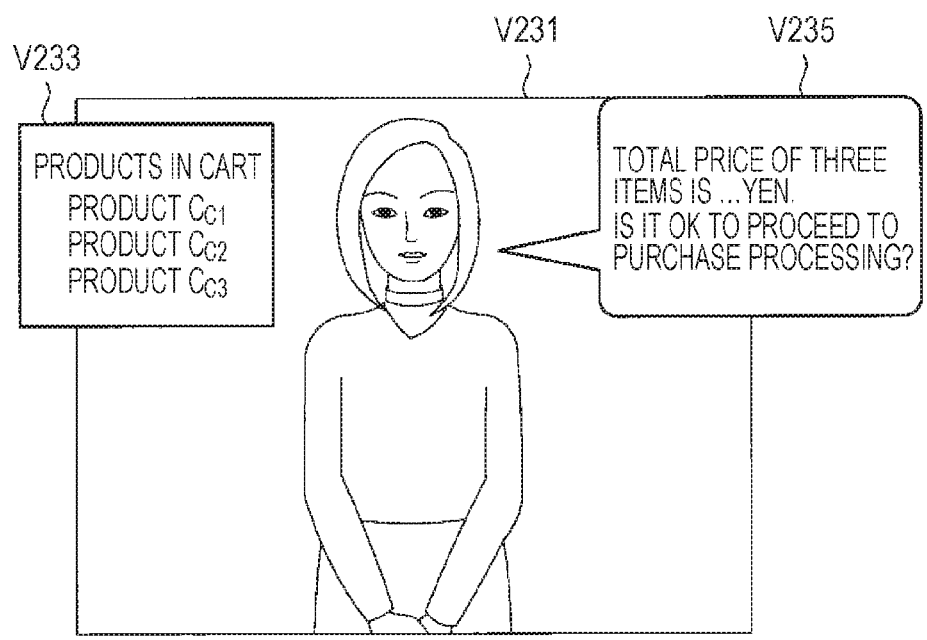
FIG. 13 is an explanatory diagram for explaining an aspect of interaction to be realized by the information processing system according to Modified Example 2.

As described above, content relating to introduction of the respective products is sequentially presented in chronological order, and the user can instruct the information processing system to put the product which is being presented into a cart by presenting intention to purchase the product through utterance, or the like. Then, when introduction of a series of products is finished, a screen for procedure for purchasing the product put into the cart (that is, a settlement screen) is presented. For example, FIG. 13 is an explanatory diagram for explaining an aspect of interaction to be realized by the information processing system according to Modified Example 2, and illustrates an example of the settlement screen. As illustrated in FIG. 13, on the settlement screen V231, as indicated with a reference numeral V235, information of a total amount, or the like, in accordance with the products put into the cart, and information such as guidance for making settlement are presented, and, thereafter, the procedure may transition to settlement procedure. Further, in this event, on the settlement screen V231, as indicated with a reference numeral V233, a list of the products put into the cart may be presented.

Note that the above is merely an example, and does not necessarily limit the configuration of the program V10 and the method for realizing interaction. As a specific example, control may be performed so that processing relating to settlement of the product is sequentially performed instead of the product being put into a cart.

Further, concerning the example of the program V10 described with reference to FIG. 11 to FIG. 13, for example, the program V10 can be generated by utilizing information to be presented to the user through a shopping site via a network. For example, concerning the MC portion V110, it is possible to generate the MC portion V110 on the basis of information regarding introduction of the product. Further, respective products may be divided into groups by utilizing information such as "recommended products" and "sale items". Still further, it is also possible to perform control so that the products purchased by the user in the past belong to a common group by utilizing purchase history of the user. Further, it is also possible to control an amount of information to be presented at the MC portion V110 corresponding to each product by distinguishing between the products purchased by the user in the past and products which have not been purchased by the user. Specifically, because the user is highly likely to already have product knowledge of the products purchased by the user in the past, information relating to introduction of the products may be limited compared to that for other products. Further, an amount of information relating to introduction of the products to be presented at the MC portion V110 may be controlled in accordance with a level of recommendation set for each product. As a specific example, control may be performed so that more detailed information is presented at the MC portion V110 for the products with higher levels of recommendation.

Further, while an example in a case where a program of mail-order sale is simulated has been described above, it is also possible to simulate programs in other categories by utilizing a similar method. For example, it is also possible to simulate a cooking program by utilizing various kinds of information posted on a web site which introduces recipe for dishes. In this case, for example, it is possible to generate the program V10 by generating the MC portion V110 on the basis of information such as introduction of a dish and explanation as to how to cook the dish by utilizing an image (a still image and a moving image) of the dish posted on a web site as content.

Figure 14:
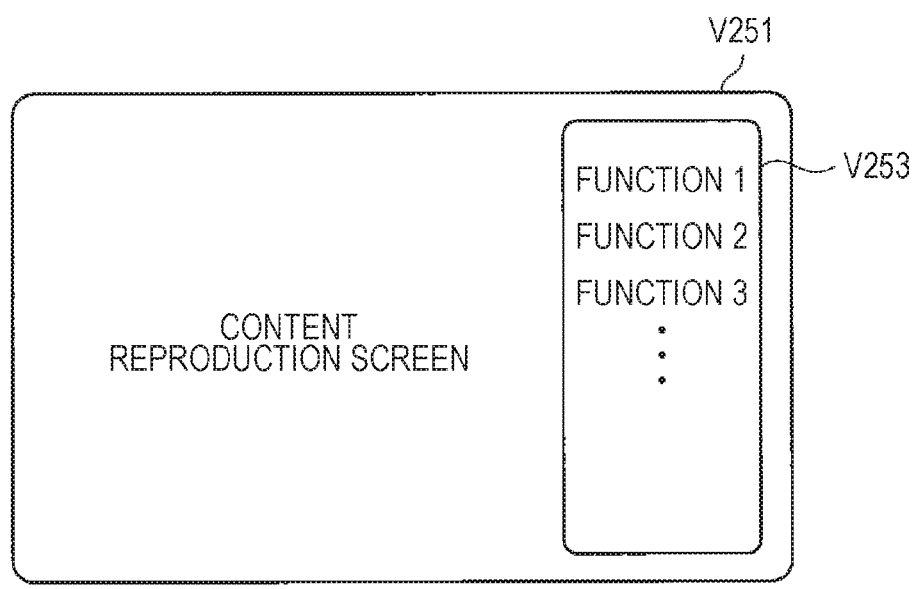
FIG. 14 is an explanatory diagram for explaining an aspect of interaction to be realized by the information processing system according to Modified Example 2.

Note that, as mentioned above, there is a case where the assumed interaction with the user differs depending on a type of the content to be presented. Therefore, for example, a list of interaction which can be implemented (that is, a list of functions which can be executed) may be presented to the user. For example, FIG. 14 is an explanatory diagram for explaining an aspect of the interaction to be realized by the information processing system according to Modified Example 2, and illustrates an example of a method for presenting a list of interaction which can be implemented. For example, in the example illustrated in FIG. 14, an example is illustrated in a case where a list of interaction which can be implemented (that is, a list of functions which can be executed) is presented as a help window V253 at part of the content reproduction screen V251 (for example, the content presenting portion V130). That is, in the example illustrated in FIG. 14, for example, a list of interaction to be presented at the help window V253 is controlled in accordance with a type of content which is being reproduced. For example, in a case where a digest of music is being reproduced as content, as interaction which can be implemented, "listen to all", "purchase", "register in favorite", "send cheers to the artist", or the like, may be presented at the help window V253.

Note that, while an example of the method for realizing interaction with the user has been described above assuming a case where the program V10 according to the present embodiment is presented, content for which interaction is to be realized is not necessarily limited only to the program V10 according to the present embodiment. That is, if it is possible to acquire information for realizing interaction relating to content to be presented (such as, for example, title name, artist name and a type of content), it is also possible to set the existing content as target for the interaction.

Further, while description has been described above while attention is focused on a case where the user inputs information mainly through utterance, a method to be used by the user to input information is not necessarily limited only to utterance. For example, information may be input through an input device such as a touch panel, a mouse and a keyboard, and information may be input through gesture, or the like. Note that, also in such a case, for example, when input of information from the user is detected, processing to be executed may be controlled in accordance with content presented to the user.

An example of the method for realizing interaction with the user during presentation of the program V10 according to the present embodiment has been described above with reference to FIG. 9 to FIG. 14 as Modified Example 2.

4.3. Modified Example 3: Example of Control for Personalization

Subsequently, an example of control for personalizing processing relating to generation of the program V110 by the information processing system according to the present embodiment in accordance with the preference of the user will be described as Modified Example 3.

Figure 15:
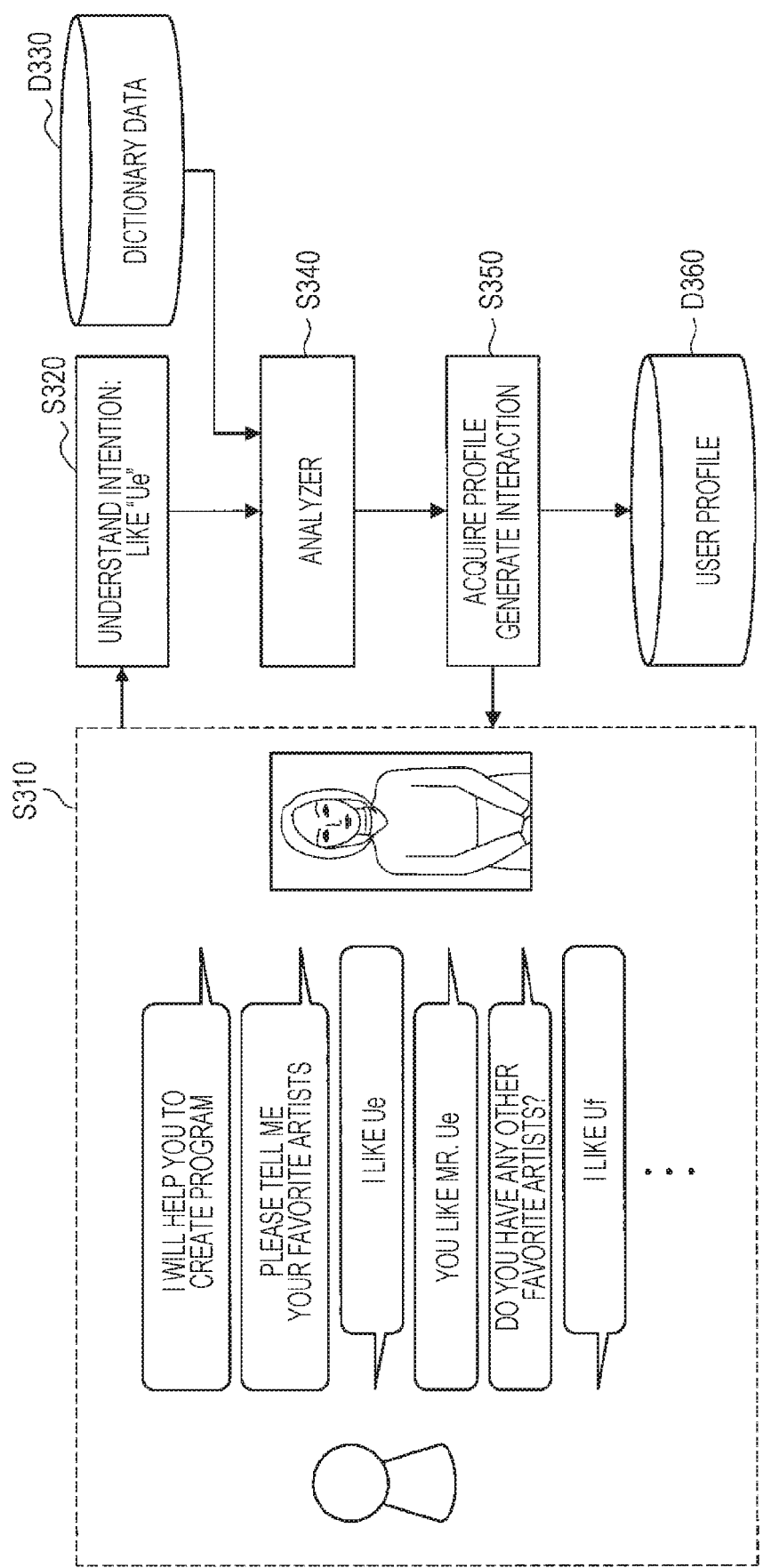
FIG. 15 is an explanatory diagram for explaining outline of an information processing system according to Modified Example 3.

For example, FIG. 15 is an explanatory diagram for explaining outline of an information processing system according to Modified Example 3, and illustrates an example of a flow of processing for personalization. Specifically, in the example illustrated in FIG. 15, information regarding the preference of the user is acquired through dialog between the user and an agent, and a profile of the user is generated in accordance with the acquired information.

For example, in the example illustrated in FIG. 15, as indicated with a reference numeral S310, the agent makes an inquiry as to the user's favorite artist to the user, and the preference of the user regarding artists is recognized in accordance with a response from the user.

As a specific example, it is assumed that the user makes a response of "I like Ue" in response to the inquiry of "please tell me your favorite artist". In this case, the information processing apparatus 100 understands (recognizes) intention of the response by performing analysis processing such as speech recognition and natural language processing on the response (utterance) of "I like Ue" from the user (S320). Further, the information processing apparatus 100 inputs information based on a result obtained by understanding user's intention to an analyzer utilizing a dictionary data D330, or the like (S340), and acquires a profile of the user as a result (S350). As a specific example, the information processing apparatus 100 may recognize the artist Ue which is included in content uttered by the user as a result by inputting the content uttered by the user to the analyzer utilizing the dictionary data D330 regarding the artist. By this means, the information processing apparatus 100 can specify the user's favorite "artist Ue".

As described above, the information processing apparatus 100 acquires the profile of the user, accumulates the profile of the user as data (that is, a user profile D360), and utilizes the user profile D360 for generation of the program V10. For example, in a case of the example illustrated in FIG. 15, the information processing apparatus 100 can recognize that the user likes the artist Ue on the basis of the user profile D360 and can extract content of the artist Ue as content to be utilized for generation of the program. Further, the information processing apparatus 100 may make various kinds of settings regarding notification of the message D110 so that the user is notified of the message D110 from an official site of the artist Ue.

Further, the information processing apparatus 100 may utilize an acquisition result of the profile of the user in the interaction S310 with the user. That is, the information processing apparatus 100 may control the interaction S310 with the user so that an inquiry for acquiring a new profile is made in accordance with the acquisition result of the profile of the user.

Further, a timing at which the interaction S310 with the user is executed is not particularly limited. For example, the interaction S310 may be started on the basis of an instruction from the user. Further, the interaction S310 may be started by being triggered by predetermined processing. As a specific example, the information processing apparatus 100 may start the interaction S310 for making an inquiry to the user as to feedback to the content after presentation of the content is completed. In this case, the information processing apparatus 100 may determine whether or not the presented content suits the preference of the user through the interaction S310 and may generate or update the user profile D360 corresponding to the user in accordance with a result of the determination.

An example of control for personalizing processing relating to generation of the program V110 by the information processing system according to the present embodiment in accordance with the preference of the user has been described above with reference to FIG. 15 as Modified Example 3.

4.4. Modified Example 4: Control of Instruction which can be Accepted from User Subsequently, an example in a case where interaction with the user is controlled by the information processing system according to the present embodiment setting an instruction which can be accepted from the user in advance will be described as Modified Example 4.

Specifically, the information processing system may be configured so that the information processing system can set in advance an instruction (for example, utterance) which can be accepted from the user (for example, a viewer of content) and processing to be executed in accordance with the instruction. With such a configuration, it is, for example, also possible to control the interaction between the information processing system and the user who views the content by a provider of the content registering in advance an instruction which the provider desires to accept from the user and processing to be executed in accordance with the instruction.

Further, settings of the above-described interaction (that is, settings of the instruction which can be accepted and processing corresponding to the instruction) may be commonly set for all content, or at least part of the settings may be set for each predetermined group (for example, for each type of content). As a specific example, part of the instruction may be set so that only content of a moving image can be accepted.

An example in a case where interaction with the user is controlled by the information processing system according to the present embodiment setting an instruction which can be accepted from the user in advance has been described above as Modified Example 4.

5. EXAMPLES

Subsequently, some Examples of the information processing system according to the present embodiment will be described using specific examples.

Figure 16:
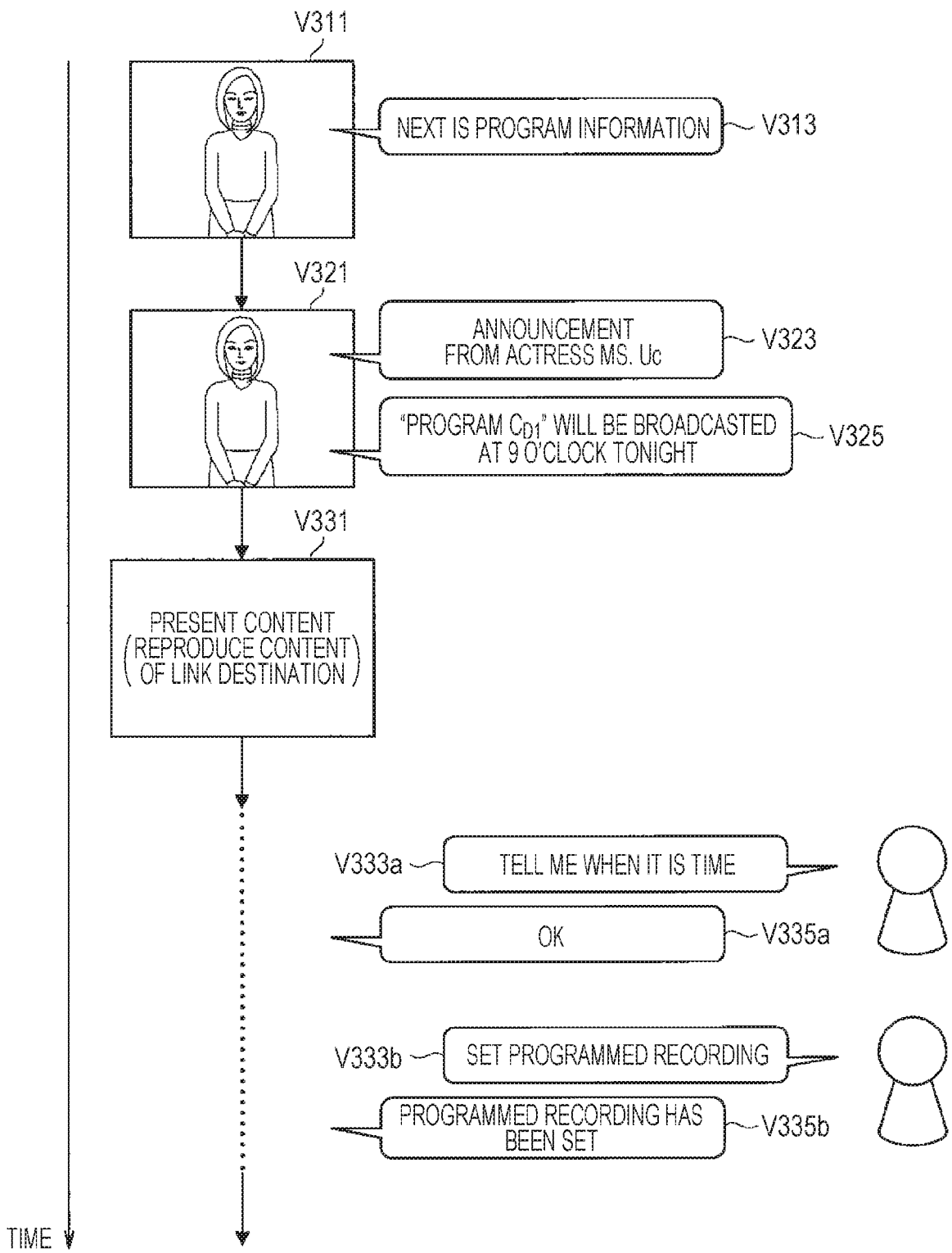
FIG. 16 is an explanatory diagram for explaining an example of a configuration of a program according to Example 1.

5.1. Example 1: Example of Configuration of Program Relating to Advertisement of Broadcast Program First, an example of a configuration of the program V10 for advertising a TV broadcast program will be described as Example 1 with reference to FIG. 16. FIG. 16 is an explanatory diagram for explaining an example of the configuration of the program V10 according to Example 1.

In the example illustrated in FIG. 16, reference numerals V311 and V321 correspond to the MC portion V110 mentioned above. Further, a reference numeral V331 corresponds to the content presenting portion V130 mentioned above. That is, in the example illustrated in FIG. 15, as indicated with the reference numeral V311, an announcement V313 indicating that this is a segment regarding a TV broadcast program is made at the beginning of the MC portion V110. Then, as indicated with a reference numeral V321, at the MC portion V110, explanation regarding a TV broadcast program $C_{D1}$ (for example, introduction of the TV broadcast program $C_{D1}$) is provided. For example, in the example illustrated in FIG. 15, an announcement V323 indicating that a notification of advertisement of the TV broadcast program $C_{D1}$ is made from an actress Uc and an announcement V325 indicating that the TV broadcast program $C_{D1}$ will be broadcasted from 9 o'clock are made. Then, after the MC portion V110 is finished, as indicated with a reference numeral V331, content relating to the introduced TV broadcast program $C_{D1}$ (for example, content for advertising the TV broadcast program $C_{D1}$) is reproduced. Note that, in this event, the information processing apparatus 100 may perform control so that content of a link destination is reproduced by accessing the link described in a message D110 relating to the content.

Further, interaction regarding the TV broadcast program $C_{D1}$ may be set for the program V10. As a specific example, as the interaction regarding the TV broadcast program $C_{D1}$, interaction regarding settings of a timer and schedule may be set. In this case, the information processing apparatus 100 may set schedule so that, for example, as indicated with a reference numeral V333a, a notification of broadcast time of the TV broadcast program $C_{D1}$ is made in response to an instruction to make a notification when it is time, from the user. Further, in this event, the information processing apparatus 100 may make a desired response (for example, a response indicating that an instruction is approved) to the instruction V333a from the user as indicated with a reference numeral V335a.

Further, as another example, as interaction regarding the TV broadcast program $C_{D1}$, interaction regarding recording of the TV broadcast program may be set. In this case, the information processing apparatus 100 may execute processing regarding recording reservation of the TV broadcast program $C_{D1}$ in response to an instruction regarding recording reservation from the user as indicated with a reference numeral V333b, for example. Further, in this event, the information processing apparatus 100 may make a desired response (for example, a response indicating that recording reservation has been completed) in response to the instruction V333b from the user as indicated with a reference numeral V335b.

An example of the program V10 for advertising a TV broadcast program has been described above with reference to FIG. 16 as Example 1.

5.2. Example 2: Application Example of MC Portion

Figure 17:
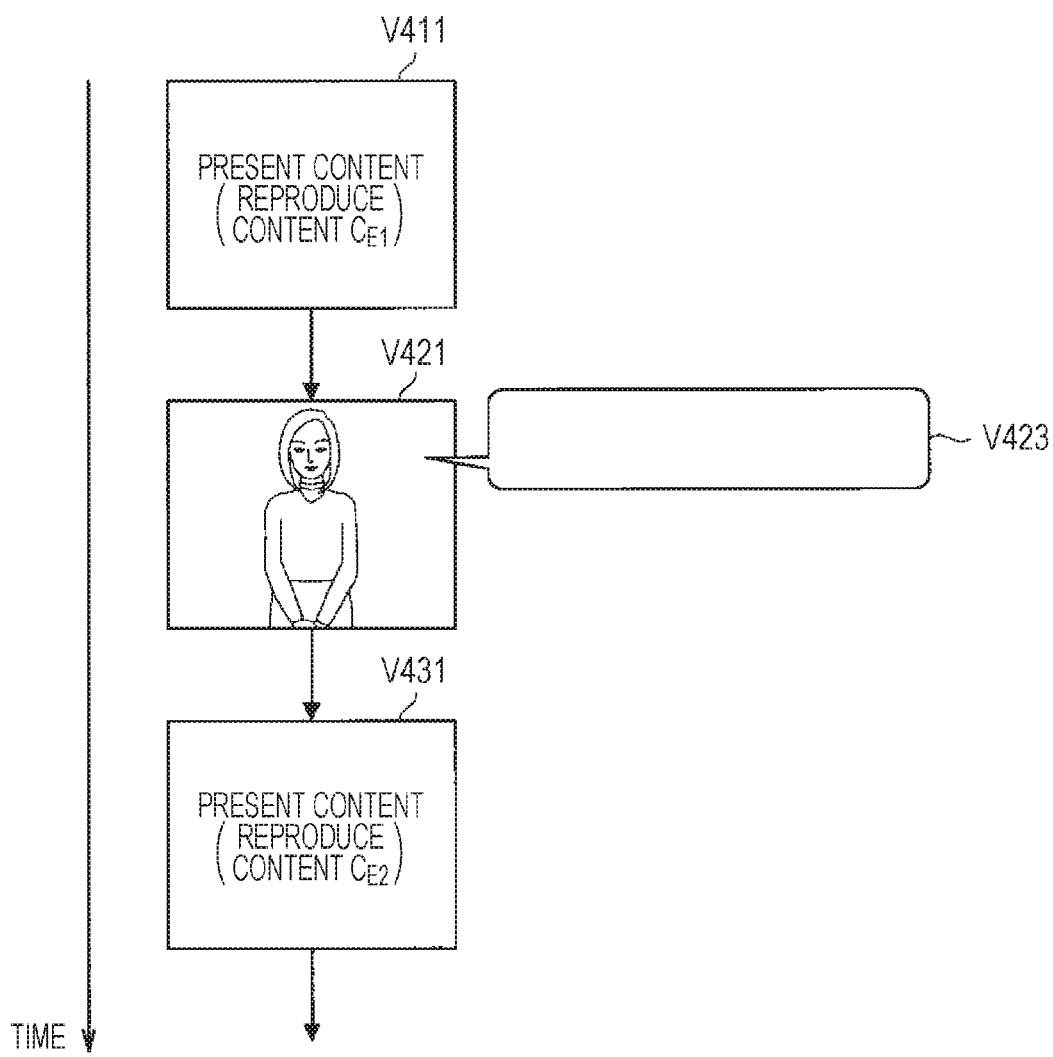
FIG. 17 is an explanatory diagram for explaining an example of a configuration of a program according to Example 2.

Subsequently, an application example of the MC portion V110 constituting the program V10 according to the present embodiment will be described as Example 2 with reference to FIG. 17. FIG. 17 is an explanatory diagram for explaining an example of a configuration of the program V10 according to Example 2.

For example, there is a case where control is performed so that, after a certain moving image is reproduced, another moving image relating to the moving image is continuously reproduced at a moving image posting site, or the like. Meanwhile, in such a case, there is a case where, before the next moving image is reproduced, loading of the moving image is performed. Assuming such a situation, control may be performed so that the MC portion V110 of the program V10 according to the present embodiment is presented during loading of the moving image.

For example, in the example illustrated in FIG. 17, the program V10 is configured so that content $C_{E1}$ and $C_{E2}$ are reproduced in this order. In FIG. 17, a reference numeral V411 corresponds to the content presenting portion V130 for reproducing the content $C_{E1}$. Further, a reference numeral V421 corresponds to the MC portion V110 corresponding to the content $C_{E2}$. Further, a reference numeral V415 corresponds to the content presenting portion V130 for reproducing the content $C_{E2}$.

That is, in the example illustrated in FIG. 17, when reproduction of the content $C_{E1}$ is completed, loading of the content $C_{E2}$ which is scheduled to be reproduced next is started. In this event, the information processing apparatus 100 causes the MC portion V110 for presenting information regarding the content $C_{E2}$ to be presented to the user during loading of the content $C_{E2}$. Note that, in this event, information V423 regarding the content $C_{E2}$ to be presented at the MC portion V110 is only required to be extracted from, for example, an introductory sentence, or the like, of the content $C_{E2}$.

With the configuration as described above, it is, for example, also possible to mask a loading screen of the content by presentation of the MC portion V110.

An application example of the MC portion V110 constituting the program V10 according to the present embodiment has been described above as Example 2 with reference to FIG. 17.

5.3. Example 3: Presentation Example of a Plurality of Pieces of Content

Figure 18:
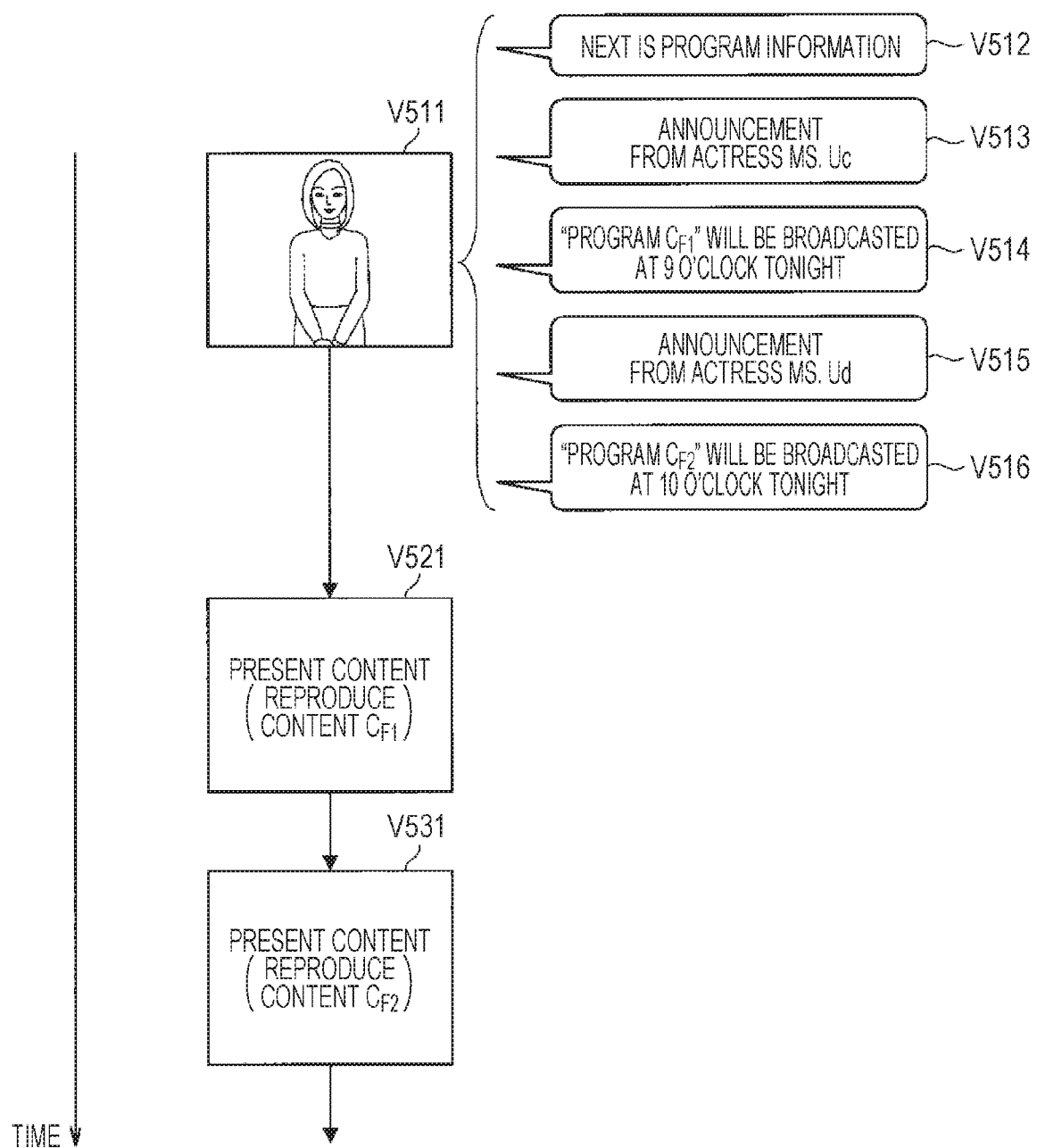
FIG. 18 is an explanatory diagram for explaining an example of a configuration of a program according to Example 3.

Subsequently, as Example 3, an example of a configuration of the program V10 in a case where a plurality of pieces of content is sequentially presented in one block V100 will be described with reference to FIG. 18. FIG. 18 is an explanatory diagram for explaining an example of the configuration of the program V10 according to Example 3.

As mentioned above, each of the blocks V100 constituting the program V10 may be generated so as to include a plurality of pieces of content. For example, in the example illustrated in FIG. 18, the block is configured so that respective pieces of content respectively regarding TV broadcast programs $C_{F1}$ and $C_{F2}$ are reproduced in this order. Note that, in the present description, there is a case where the respective pieces of content respectively regarding the TV broadcast programs $C_{F1}$ and $C_{F2}$ will be simply referred to as "content $C_{F1}$" and "content $C_{F2}$" for convenience sake. That is, in FIG. 18, a reference numeral V511 corresponds to the MC portion V110 of the block V100 corresponding to the content $C_{F1}$ and $C_{F2}$. Further, a reference numeral V521 corresponds to the content presenting portion V130 for reproducing the content $C_{F1}$. Still further, a reference numeral V531 corresponds to the content presenting portion V130 for reproducing the content $C_{F2}$.

In the example illustrated in FIG. 18, for example, as indicated with a reference numeral V511, at the MC portion V110 at the beginning, explanation regarding the content $C_{F1}$ and $C_{F2}$ is presented. Specifically, an announcement V512 indicating that this is a segment regarding the TV broadcast program is made.

Then, as indicated with reference numerals V513 and V514, explanation corresponding to the content $C_{F1}$ is provided. As a specific example, in the example illustrated in FIG. 18, an announcement V513 indicating that a notification of advertisement of the TV broadcast program $C_{F1}$ is made from an actress Uc, and an announcement V514 indicating that the TV broadcast program $C_{F1}$ will be broadcasted from 9 o'clock are made. Note that the explanation corresponding to the content $C_{F1}$ indicated as the announcements V513 and V514 is only required to be generated on the basis of, for example, information extracted from the message D110 relating to the content $C_{F1}$.

Then, as indicated with reference numerals V515 and V516, explanation corresponding to the content $C_{F2}$ is provided. As a specific example, in the example illustrated in FIG. 18, an announcement V515 indicating that a notification of advertisement of the TV broadcast program $C_{F2}$ is made from an actress Ud, and an announcement V516 indicating that the TV broadcast program $C_{F2}$ will be broadcasted from 10 o'clock are made. Note that the explanation corresponding to the content $C_{F2}$ indicated as the announcements V515 and V516 is only required to be generated on the basis of, for example, information extracted from the message D110 relating to the content $C_{F2}$.

As described above, as indicated with a reference numeral V511, at the MC portion V110, description regarding the content $C_n$ and $C_{F2}$ to be sequentially reproduced thereafter is provided. Further, after the MC portion V110 is presented, the content presenting portions V521 and V531 are sequentially presented in this order.

Note that settings (that is, interaction) regarding the instruction which can be accepted from the user in this event may be set for individually for each of the content $C_{F1}$ and $C_{F2}$ or may be set for each block V100.

An example in a case where a plurality of pieces of content is sequentially presented in one block V100 has been described above as Example 3 with reference to FIG. 18.

Figure 19:
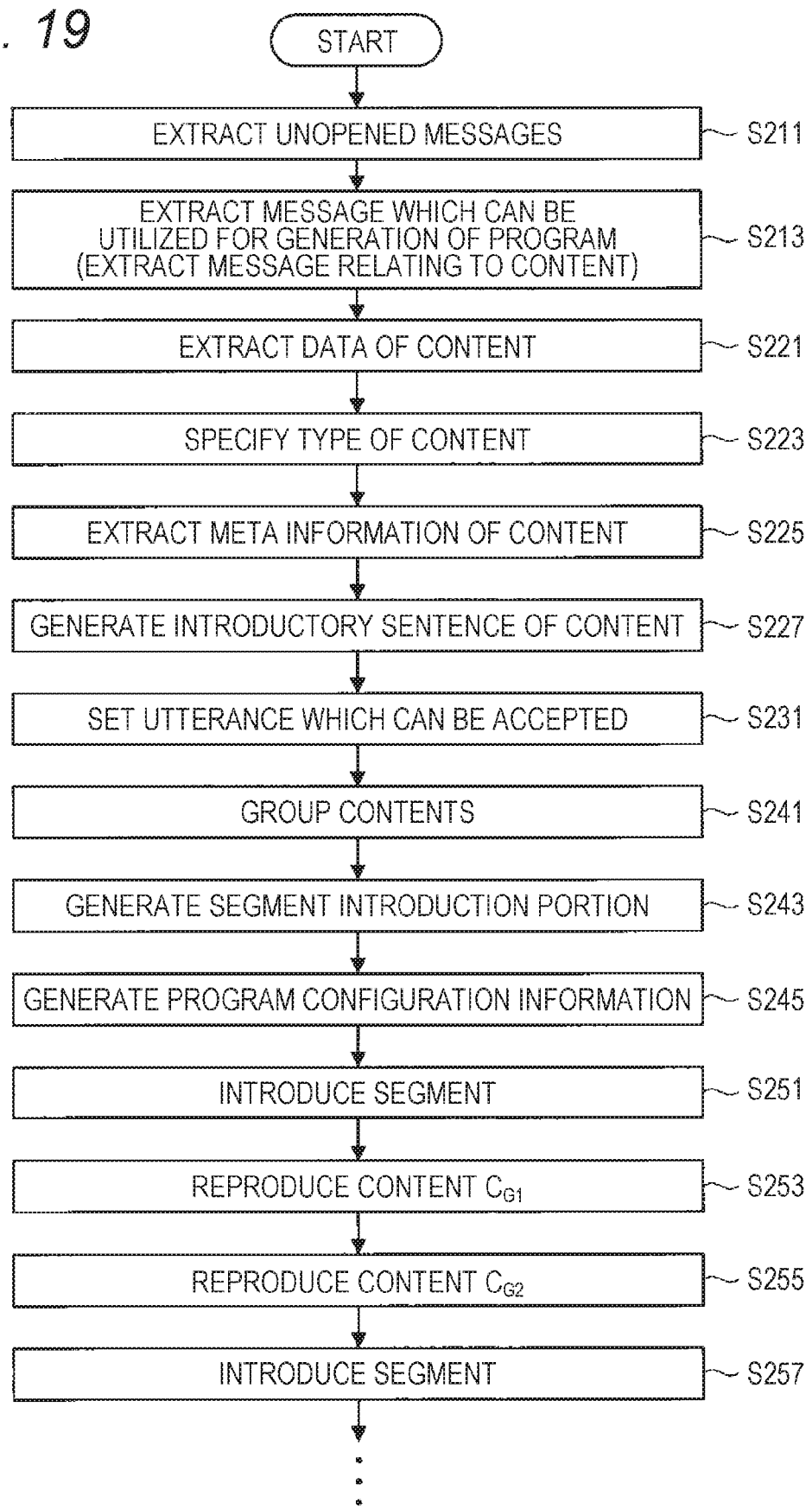
FIG. 19 is an explanatory diagram for explaining an example of a flow of a series of processing of an information processing system according to Example 4.

5.4. Example 4: Example of Flow of Processing Relating to Generation and Presentation of Program Subsequently, an example of a flow of a series of processing relating to generation and presentation of the program V10 in the information processing system according to the present embodiment will be described as Example 4 with reference to FIG. 19. FIG. 19 is an explanatory diagram for explain an example of a flow of a series of processing of the information processing system according to Example 4.

First, the information processing apparatus 100 extracts at least part of messages D110 which satisfy predetermined conditions from one or more messages D110 which a desired user is notified of. As a specific example, the information processing apparatus 100 extracts unopened messages D110 from the messages D110 which the user is notified of (S211). Further, the information processing apparatus 100 extracts a message D110 which can be utilized for generation of the program (for example, a message D110 relating to the content) from the extracted unopened messages D110 (S213).

Then, the information processing apparatus 100 extracts content C1 to be utilized for generation of the program V10 on the basis of the extraction result of the message D110. For example, the information processing apparatus 100 may extract data of the content C1 attached to the message D110 from the message D110. Further, as another example, the information processing apparatus 100 may extract data of the content C1 by accessing a link presented in the message D110 (S221). Further, the information processing apparatus 100 may specify a type of the content C1. For example, the information processing apparatus 100 may specify a type of the content C1 on the basis of the extracted data of the content C1. Further, as another example, the information processing apparatus 100 may specify a type of the content C1 on the basis of information included in the message D110 (for example, information indicating desired intention) (S223). Further, the information processing apparatus 100 may extract meta information of the content C1 from the data of the content C1, the message D110 relating to the content C1, or the like (S225). Then, the information processing apparatus 100 generates information regarding the content C1 to be presented at the MC portion V110 (such as, for example, an introductory sentence of the content C1) on the basis of the extracted various kinds of information (such as, for example, meta information of the content C1) (S227).

Further, the information processing apparatus 100 may make settings of the interaction with the user upon presentation of the program V10. For example, the information processing apparatus 100 may make settings of utterance which can be accepted, settings of processing to be executed in accordance with the utterance, or the like (S231).

Subsequently, the information processing apparatus 100 executes processing relating to generation of the program V10. For example, the information processing apparatus 100 may classify the extracted content C1 into one or more groups in accordance with predetermined conditions (S241). In this case, the information processing apparatus 100 may generate information of an introduction portion of a segment corresponding to each group, to be presented at the MC portion V110 (S243). Then, the information processing apparatus 100 make settings regarding a configuration of the program such as order in which the content is to be presented and order of blocks corresponding to the respective groups and generates information regarding the settings (that is, information regarding the configuration of the program) (S245). As described above, the program V10 is generated.

Then, the information processing apparatus 100 causes, for example, the terminal apparatus 300 to present the generated program V10 on the basis of the generated information regarding the configuration of the program. By this means, the generated program V10 is presented to the user via the terminal apparatus 300. Specifically, first, the MC portion V110 (such as, for example, introduction of the segment) corresponding to the first block V100 is reproduced, and, thereafter, the content C1 included in the block V100 is sequentially reproduced. For example, in the example illustrated in FIG. 19, first, content $C_{G1}$ is reproduced (S253), and, then, content $C_{G2}$ is reproduced (S255). Then, when presentation of the block V100 is completed, presentation of the next block V100 is started (S257). As described above, the extracted one or more pieces of content C1 are sequentially presented to the user in chronological order by presentation of the program V10. Then, when presentation of the extracted series of content C1 is completed, processing relating to presentation of the program V10 is finished.

An example of the flow of a series of processing relating to generation and presentation of the program V10 in the information processing system according to the present embodiment has been described above as Example 4 with reference to FIG. 19 using specific examples.

6. HARDWARE CONFIGURATION

Figure 20:
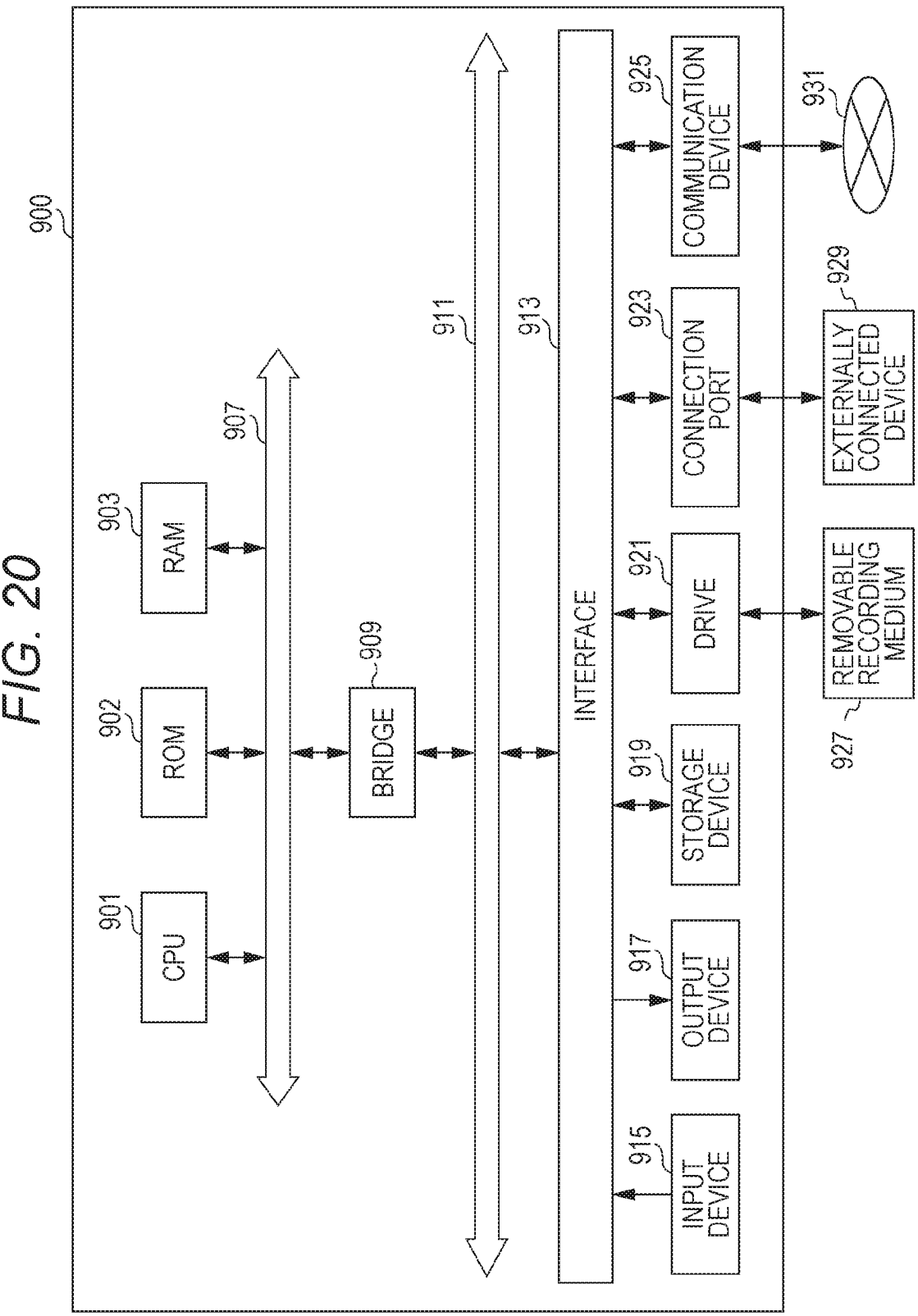
FIG. 20 is a functional block diagram illustrating a configuration example of a hardware configuration of an information processing apparatus constituting an information processing system according to an embodiment of the present disclosure.

Subsequently, an example of a hardware configuration of an information processing apparatus included in the information processing system according to an embodiment of the present disclosure, like the information processing apparatus 100 and the terminal apparatus 300 described above, will be described in detail with reference to FIG. 20. FIG. 20 is a functional block diagram illustrating an example of the hardware configuration of the information processing apparatus constituting the information processing system according to an embodiment of the present disclosure.

The information processing apparatus 900 included in the information processing system according to the present embodiment mainly includes a CPU 901, a ROM 902, and a RAM 903. Furthermore, the information processing apparatus 900 also includes a host bus 907, a bridge 909, an external bus 911, an interface 913, an input device 915, an output device 917, a storage device 919, a drive 921, a connection port 923, and a communication device 925.

The CPU 901 serves as an arithmetic processing device and a control device, and controls the overall operation or a part of the operation of the information processing apparatus 900 according to various programs recorded in the ROM 902, the RAM 903, the storage device 919, or a removable recording medium 927. The ROM 902 stores programs, computational parameters, and the like used by the CPU 901. The RAM 903 temporarily stores programs used by the CPU 901, parameters that change as appropriate during the execution of the programs, and the like. These are connected with each other via the host bus 907 including an internal bus such as a CPU bus. The control unit 350 of the terminal apparatus 300 illustrated in FIG. 2 and the control unit 130 of the information processing apparatus 100 illustrated in FIG. 3 may be configured by the CPU 901, for example.

The host bus 907 is connected to the external bus 911 such as a Peripheral Component Interconnect/Interface (PCI) bus via the bridge 909. Additionally, the input device 915, the output device 917, the storage device 919, the drive 921, the connection port 923, and the communication device 925 are connected to the external bus 911 via the interface 913.

The input device 915 is an operation mechanism operated by a user, such as a mouse, a keyboard, a touch panel, buttons, a switch, a lever, or a pedal, for example. Also, the input device 915 may be a remote control mechanism (a so-called remote control) using, for example, infrared light or other radio waves, or may be an external connection device 929 such as a mobile phone or a PDA conforming to the operation of the information processing apparatus 900. Furthermore, the input device 915 generates an input signal on the basis of, for example, information which is input by a user with the above operation mechanism, and includes an input control circuit for outputting the input signal to the CPU 901, for example. The user of the information processing apparatus 900 can input various data to the information processing apparatus 900 and can instruct the information processing apparatus 900 to perform processing by operating the input device 915.

The output device 917 includes a device capable of visually or audibly notifying a user of acquired information. Examples of such a device include display devices such as a CRT display device, a liquid crystal display device, a plasma display device, an EL display device, and lamps, audio output devices such as a speaker and a headphone, a printer, and the like. For example, the output device 917 outputs a result obtained by various processes performed by the information processing apparatus 900. More specifically, the display device displays, in the form of texts or images, a result obtained by various processes performed by the information processing apparatus 900. On the other hand, the audio output device converts an audio signal including reproduced audio data, sound data, and the like into an analog signal, and outputs the analog signal. For example, the output unit 320 of the terminal apparatus 300 illustrated in FIG. 2 may be configured by the output device 917.

The storage device 919 is a device for storing data configured as an example of a storage unit of the information processing apparatus 900. The storage device 919 is configured from, for example, a magnetic storage device such as a Hard Disk Drive (HDD), a semiconductor storage device, an optical storage device, a magneto-optical storage device, or the like. This storage device 919 stores programs to be executed by the CPU 901, various data, and the like. For example, the storage unit 340 of the terminal apparatus 300 illustrated in FIG. 2 and the storage unit 120 of the information processing apparatus 100 illustrated in FIG. 3 may be configured by any of the storage device 919, the ROM 902, or the RAM 903, or a combination of two or more of the storage device 919, the ROM 902, or the RAM 903.

The drive 921 is a reader/writer for recording medium, and is embedded in the information processing apparatus 900 or attached externally thereto. The drive 921 reads information recorded in the attached removable recording medium 927 such as a magnetic disk, an optical disc, a magneto-optical disk, or a semiconductor memory, and outputs the read information to the RAM 903. Furthermore, the drive 921 can write record in the attached removable recording medium 927 such as a magnetic disk, an optical disc, a magneto-optical disk, or a semiconductor memory. The removable recording medium 927 is, for example, a DVD medium, an HD-DVD medium, a Blu-ray (registered trademark) medium, or the like. In addition, the removable recording medium 927 may be a CompactFlash (CF) (registered trademark), a flash memory, a Secure Digital Memory Card (SD memory card), or the like. Alternatively, the removable recording medium 927 may be, for example, an Integrated Circuit Card (IC card) equipped with a non-contact IC chip, an electronic appliance, or the like.

The connection port 923 is a port for allowing devices to directly connect to the information processing apparatus 900. Examples of the connection port 923 include a Universal Serial Bus (USB) port, an IEEE1394 port, a Small Computer System Interface (SCSI) port, and the like. Other examples of the connection port 923 include an RS-232C port, an optical audio terminal, a High-Definition Multimedia Interface (HDMI) (registered trademark) port, and the like. By the external connection device 929 connecting to this connection port 923, the information processing apparatus 900 directly obtains various types of data from the external connection device 929 and provides various types of data to the external connection device 929.

The communication device 925 is a communication interface including, for example, a communication device for connecting to a communication network 931 or the like. The communication device 925 is, for example, a wired or wireless Local Area Network (LAN), Bluetooth (registered trademark), a communication card for Wireless USB (WUSB), or the like. Alternatively, the communication device 925 may be a router for optical communication, a router for Asymmetric Digital Subscriber Line (ADSL), a modem for various communications, or the like. This communication device 925 can transmit and receive signals and the like in accordance with a predetermined protocol such as TCP/IP on the Internet and with other communication devices, for example. In addition, the communication network 931 connected to the communication device 925 includes a network and the like, which is connected via wire or wirelessly, and may be, for example, the Internet, a home LAN, infrared communication, radio wave communication, satellite communication, or the like. For example, the communication unit 310 of the terminal apparatus 200 illustrated in FIG. 2 and the communication unit 110 of the information processing apparatus 100 illustrated in FIG. 3 may be configured by the communication device 925.

Heretofore, an example of the hardware configuration capable of realizing the functions of the information processing apparatus 900 included in the information processing system according to the embodiment of the present disclosure has been shown. Each of the structural elements described above may be configured using a general-purpose material, or may be implemented by hardware dedicated to the function of each structural element. Accordingly, the hardware configuration to be used can be changed as appropriate according to the technical level at the time of carrying out the present embodiment. Note that, although not shown in FIG. 20, for example, it naturally includes various configurations corresponding to the information processing apparatus 900 included in the information processing system.

Note that it is also possible to develop a computer program for realizing the respective functions of the information processing apparatus 900 included in the information processing system according to the present embodiment as described above, and implement the computer program in a personal computer or the like. In addition, a computer-readable recording medium storing such a computer program may also be provided. The recording medium may be a magnetic disk, an optical disc, a magneto-optical disk, flash memory, or the like, for example. Furthermore, the above computer program may also be delivered via a network, for example, without using a recording medium. In addition, the number of computers causing the computer program to be executed is not particularly limited. For example, the computer program may be executed in cooperation of a plurality of computers (e.g., a plurality of servers or the like).

7. CONCLUSION

As described above, in the information processing system according to an embodiment of the present disclosure, the information processing apparatus 100 extracts at least part of messages from one or more messages which the user is notified of, on the basis of predetermined conditions. Note that the above-described predetermined conditions may include, for example, conditions in accordance with the user (in other words, conditions personalized for each user). Further, the information processing apparatus 100 generates second content (for example, the program V10 mentioned above) which includes one or more pieces of first content depending on the above-described extracted at least part of the messages, and, in which information is presented in chronological order.

With such a configuration, the information processing system according to the present embodiment can provide content which suits the preference of the user better, to the user as the program V10. That is, the user can passively view or listen to the content which suits the preference of the user better (that is, passively acquire information which suits the preference of the user better) without performing cumbersome operation (active operation) such as extraction of information through search, or the like, from a large amount of information which the user is notified of and confirmation of content of the notified messages.

Further, the information processing apparatus 100 may perform control so that processing, which is appropriate for information based on user input via a predetermined input unit and a situation concerning presentation of the content, is executed. That is, the information processing apparatus 100 may perform control so that, in a case where information is input from the user via a predetermined input unit, processing appropriate for the content presented to the user when the user input is detected is executed.

With such a configuration, the information processing system according to the present embodiment can realize interaction with the user during presentation of the program V10 and can eventually dynamically execute processing regarding content which is being presented in accordance with an instruction from the user. That is, according to the information processing system according to the present embodiment, it is possible to present to the user the program V10 which can realize various kinds of interaction as well as presentation of the content The preferred embodiment of the present disclosure has been described above with reference to the accompanying drawings, whilst the technical scope of the present disclosure is not limited to the above examples. A person skilled in the art may find various alterations and modifications within the scope of the technical idea described in the appended claims, and it should be understood that they will naturally come under the technical scope of the present disclosure.

For example, while, in the above-described embodiments, attention has been focused on a case where the information processing apparatus 100 generates the program V10, if control is performed so that the program V10 is presented to the user via the terminal apparatus 300, a configuration and processing for realizing this are not particularly limited. As a specific example, in place of the program V10 itself, data for constructing the program V10 (such as, for example, parts for constructing the MC portion V110 and the content presenting portion V130) may be generated on the information processing apparatus 100 side, and the program V10 may be constructed on the basis of the data on the terminal apparatus 300 side.

Further, each of the programs V10 generated for each user on the basis of the messages which have respectively reached a plurality of users may be presented via a common terminal apparatus 300. In this case, for example, the user is recognized on the basis of an image of a face of the user captured by the imaging unit, or the like, and the program V10 generated for the user in accordance with the recognition result of the user may be presented via the terminal apparatus 300.

Further, in a case where there is a plurality of users which can be targets for presentation of the program V10, modes for presenting the program V10 to the plurality of users may be changed as appropriate. As a specific example, it is assumed that the terminal apparatus 300 recognizes that there is a plurality of users around the terminal apparatus 300 on the basis of an image capturing result by the imaging unit, or the like. In this case, for example, the program V10 may be generated on the basis of messages transmitted from a common transmitter to at least two or more users among a plurality of users, and the program V10 may be presented via the terminal apparatus 300. Further, as another example, the program V10 may be generated on the basis of messages individually and respectively transmitted to at least two or more users among a plurality of users, and the program V10 may be presented via the terminal apparatus 300. In this case, the program V10 including content respectively extracted from the messages which are individually and respectively transmitted to the two or more users, may be generated.

Further, a timing at which the program V10 is generated and a timing at which the generated program V10 is presented are not particularly limited. For example, generation of the program V10 and presentation of the generated program V10 may be performed for each predetermined period. Further, as another example, in a case where recognition of the user is performed, the program V10 may be presented by being triggered by processing relating to the recognition. As a specific example, in a case where the face of the user is detected, and the user is recognized on the basis of the detection result of the face, generation of the program V10 and presentation of the generated program V10 may be performed after a predetermined period has elapsed since the face was detected.

Further, generation of the program V10 and presentation of the generated program V10 may be performed in response to an active instruction from the user. Further, in this case, the content to be included in the program V10 may be controlled in accordance with content of the instruction from the user. For example, in a case where the program V10 is generated in response to utterance of "is there any information?" by the user, control may be performed so that a type of content to be included in the program V10 is not limited. Further, as another example, in a case where the program V10 is generated in response to utterance of "play some music" by the user, a type of content to be included in the program V10 may be limited to music.

Further, the effects described in this specification are merely illustrative or exemplified effects, and are not limitative. That is, with or in place of the above effects, the technology according to the present disclosure may achieve other effects that are clear to those skilled in the art from the description of this specification.

Additionally, the technical scope of the present disclosure may also be configured as below.

(1)

An information processing apparatus including:

an extracting unit configured to extract at least part of messages from one or more messages which a user is notified of, on the basis of a predetermined condition; and a generating unit configured to generate second content which includes one or more pieces of first content depending on the extracted at least part of messages, and in which information is presented in chronological order.

(2)

The information processing apparatus (1), in which the predetermined condition includes a condition in accordance with the user.

(3)

The information processing apparatus (1) or (2), in which the predetermined condition includes a condition regarding content which can be utilized for generation of the second content.

(4)

The information processing apparatus according to any one of (1) to (3), in which the predetermined condition includes a condition regarding transmission sources of the messages.

(5)

The information processing apparatus according to any one of (1) to (4), in which the extracted at least part of messages includes a first message including a word or phrase indicating predetermined intention.

(6)

The information processing apparatus according to (5), in which the extracted at least part of messages includes a second message relating to the first message.

(7)

The information processing apparatus according to (6), in which the second content includes the first content specified in accordance with at least one of the first message or the second message.

(8)

The information processing apparatus according to any one of (1) to (7), further including a communication unit configured to transmit data for presenting the second content to other apparatuses.

(9)

The information processing apparatus according to any one of (1) to (7), further including a first control unit configured to perform control so that the second content is output via a predetermined output unit.

(10)

The information processing apparatus according to any one of (1) to (9), further including a second control unit configured to perform control so that processing appropriate for information based on user input and a situation concerning presentation of the second content is executed.

(11)

The information processing apparatus according to (10), in which the second control unit performs control so that processing appropriate for the first content presented when the user input is detected is executed.

(12)

The information processing apparatus according to (11), in which, in a case where processing appropriate for the first content which is being presented is executed, after presentation of the first content is finished and the processing is executed, presentation of another first content different from the first content is started.

(13)

The information processing apparatus according to any one of (10) to (12), in which the information based on the user input includes information based on utterance of the user.

(14)

The information processing apparatus according to any one of (1) to (13), in which the second content includes one or more blocks, the one or more blocks including information based on content of the at least part of messages and one or more pieces of the first content.

(15)

The information processing apparatus according to (14), in which the block includes one or more pieces of the first content extracted in accordance with a predetermined condition, among one or more pieces of the first content depending on the extracted at least part of messages.

(16)

The information processing apparatus according to (14) or (15), in which the block is set for each type of the first content.

(17)

An information processing apparatus including:

an acquiring unit configured to acquire second content which is extracted from one or more messages which a user is notified of, which includes one or more pieces of first content depending on at least part of messages on the basis of a predetermined condition, and in which information is presented in chronological order; and a control unit configured to perform control so that the second content is presented via an output unit.

(18)

An information processing method including:

by a computer, extracting at least part of messages from one or more messages which a user is notified of, on the basis of a predetermined condition; and generating second content which includes one or more pieces of first content depending on the extracted at least part of messages, and in which information is presented in chronological order.

(19)

A program for causing a computer to execute:

extracting at least part of messages from one or more messages which a user is notified of, on the basis of a predetermined condition; and generating second content which includes one or more pieces of first content depending on the extracted at least part of messages, and in which information is presented in chronological order.

REFERENCE SIGNS LIST

1 Information processing system
100 Information processing apparatus
110 Communication unit
120 Storage unit
130 Control unit
131 Communication control unit
132 Message extracting unit
133 Content extracting unit
134 Input/output control unit
135 Function executing unit
190 Storage unit
200 Terminal apparatus
300 Terminal apparatus
310 Communication unit
320 Output unit
330 Input unit
340 Storage unit
350 Control unit
351 Communication control unit
353 Content acquiring unit
355 Input/output control unit

The invention claimed is:

1. An information processing apparatus comprising:

processing circuitry configured to extract at least part of messages from one or more messages which a user is notified of, on a basis of a predetermined condition, the at least part of the messages referring to first content, the first content being at least one of music, movie, product, and TV program;

generate an introduction movie that introduces the first content, the introduction movie including automatically synthesized speech that introduces the first content, the speech being generated based on the at least part of the messages;

retrieve the first content via the Internet; and generate second content by combining the introduction movie with the first content, the first content being allocated after the introduction movie chronologically, wherein the extracted at least part of the messages includes a first message including a word or phrase indicating predetermined intention, the extracted at least part of the messages includes a second message relating to the first message, and the second content includes the first content specified in accordance with at least one of the first message or the second message.

2. The information processing apparatus according to claim 1, wherein the predetermined condition includes a condition in accordance with the user.

3. The information processing apparatus according to claim 1, wherein the predetermined condition includes a condition regarding content which can be utilized for generation of the second content.

4. The information processing apparatus according to claim 1, wherein the predetermined condition includes a condition regarding transmission sources of the messages.

5. The information processing apparatus according to claim 1, wherein the processing circuitry is configured to transmit data for presenting the second content to other apparatuses.

6. The information processing apparatus according to claim 1, wherein the processing circuitry is configured to perform control so that the second content is output via a predetermined display or a predetermined speaker.

7. The information processing apparatus according to claim 1, wherein the processing circuitry is configured to perform control so that processing based on user input and a situation concerning presentation of the second content is executed.

8. The information processing apparatus according to claim 7, wherein the processing circuitry performs control so that processing based on the first content presented when the user input is detected is executed.

9. An information processing apparatus comprising:

processing circuitry configured to extract at least part of messages from one or more messages which a user is notified of, on a basis of a predetermined condition, the at least part of the messages referring to first content, the first content being at least one of music, movie, product, and TV program;

generate an introduction movie that introduces the first content, the introduction movie including automatically synthesized speech that introduces the first content, the speech being generated based on the at least part of the messages;

retrieve the first content via the Internet;

generate second content by combining the introduction movie with the first content, the first content being allocated after the introduction movie chronologically;

perform control so that processing based on user input and a situation concerning presentation of the second content is executed; and perform control so that processing based on the first content presented when the user input is detected is executed, wherein in a case where the processing based on the first content is executed, after presentation of the first content is finished and the processing based on the first content is executed, presentation of another first content different from the first content is started.

10. The information processing apparatus according to claim 7, wherein the information based on the user input includes information based on utterance of the user.

11. The information processing apparatus according to claim 1, wherein the second content includes one or more blocks, the one or more blocks including information based on content of the at least part of the messages and one or more pieces of the first content.

12. An information processing apparatus comprising:
processing circuitry configured to
extract at least part of messages from one or more messages which a user is notified of, on a basis of a predetermined condition, the at least part of the messages referring to first content, the first content being at least one of music, movie, product, and TV program;

generate an introduction movie that introduces the first content, the introduction movie including automatically synthesized speech that introduces the first content, the speech being generated based on the at least part of the messages;

retrieve the first content via the Internet; and generate second content by combining the introduction movie with the first content, the first content being allocated after the introduction movie chronologically, wherein the second content includes one or more blocks, the one or more blocks including information based on content of the at least part of the messages and one or more pieces of the first content, and the block includes one or more pieces of the first content extracted in accordance with a predetermined condition, among one or more pieces of the first content depending on the extracted at least part of the messages.

13. The information processing apparatus according to claim 11, wherein the block is set for each type of the first content.

* * * * *